(12) United States Patent
Yamagata et al.

(10) Patent No.: US 11,017,277 B2
(45) Date of Patent: May 25, 2021

(54) IMAGE PROCESSING APPARATUS, IMAGE PROCESSING METHOD AND STORAGE MEDIUM, WITH CORRECTION AMOUNT FOR CORRECTING LINE WIDTH IN ACCORDANCE WITH COLOR OF LINE

(71) Applicant: CANON KABUSHIKI KAISHA, Tokyo (JP)

(72) Inventors: Tatsuhiro Yamagata, Inagi (JP); Okinori Tsuchiya, Yokohama (JP); Yugo Mochizuki, Kawasaki (JP); Kouta Murasawa, Yokohama (JP); Kazuya Ogasawara, Yokohama (JP); Toshiki Miyazaki, Tokyo (JP); Masao Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/575,709

(22) Filed: Sep. 19, 2019

(65) Prior Publication Data
US 2020/0104659 A1 Apr. 2, 2020

(30) Foreign Application Priority Data
Sep. 27, 2018 (JP) .............................. JP2018-182957

(51) Int. Cl.
*G06K 15/02* (2006.01)
(52) U.S. Cl.
CPC ................................ *G06K 15/1842* (2013.01)
(58) Field of Classification Search
CPC .................................................. G06K 15/1842

USPC ........................................................... 358/1.2
See application file for complete search history.

(56) References Cited

U.S. PATENT DOCUMENTS

| | | |
|---|---|---|
| 7,924,469 B2 | 4/2011 | Ono et al. |
| 7,944,588 B2 | 5/2011 | Yamada et al. |
| 8,175,155 B2 | 5/2012 | Suwa et al. |
| 8,237,991 B2 | 8/2012 | Ono et al. |
| 8,405,876 B2 | 3/2013 | Nakatani et al. |
| 8,705,889 B2 | 4/2014 | Murasawa |
| 8,817,326 B2 | 8/2014 | Murasawa |
| 8,817,327 B2 | 8/2014 | Kamijima |
| 9,135,523 B2 | 9/2015 | Kato et al. |
| 9,232,109 B2 | 1/2016 | Suwa et al. |
| 9,386,186 B2 | 7/2016 | Mochizuki et al. |

(Continued)

FOREIGN PATENT DOCUMENTS

JP 2012-108569 A 6/2012

*Primary Examiner* — Jacky X Zheng
(74) *Attorney, Agent, or Firm* — Venable LLP

(57) ABSTRACT

An object is to reduce a difference between a target line width and a width of a line that is printed by a printing apparatus by correcting the line width in accordance with color information indicating a color of the line in a case where an image is printed by the printing apparatus based on image data including the line based on print data. The present disclosure is an image processing apparatus having an acquisition unit configured to acquire a drawing command in which a color and a line width of a line are specified, a determination unit configured to determine a correction amount for correcting the line width specified in the drawing command based on the color of the line specified in the drawing command, and a correction unit configured to correct the line width specified in the drawing command in accordance with the correction amount.

19 Claims, 20 Drawing Sheets

(56) References Cited

U.S. PATENT DOCUMENTS

| | | |
|---|---|---|
| 9,704,221 B2 | 7/2017 | Hori et al. |
| 10,290,135 B2 | 5/2019 | Mizoguchi et al. |
| 2011/0217052 A1* | 9/2011 | Usui ...................... G03G 15/00 399/15 |
| 2012/0120425 A1* | 5/2012 | Kamijima .............. G06K 15/02 358/1.9 |
| 2012/0163850 A1* | 6/2012 | Shirafuji ............ G03G 15/0189 399/72 |
| 2012/0268759 A1 | 10/2012 | Ono et al. |
| 2019/0158688 A1 | 5/2019 | Murasawa et al. |

* cited by examiner

| VECTOR DRAWING COMMAND | LINE DRAWING COMMAND | PEN DRAWING INITIALIZATION |
| --- | --- | --- |
| | | PEN DRAWING RANGE SETTING |
| | | PEN SPECIFICATION |
| | | LINE WIDTH SETTING OF PEN |
| | | COLOR SETTING OF PEN |
| | | CONNECTION SHAPE SETTING OF PEN |
| | | MOVE WITHOUT DRAWING |
| | | SINGLE-STROKE DRAWING WHILE MOVING COORDINATE |
| | | LIFT PEN |
| | | FEED PAGE |
| | CHARACTER DRAWING COMMAND | CHARACTER FONT SPECIFICATION |
| | | CHARACTER SPECIFICATION |
| | HATCHING DRAWING COMMAND | HATCHING KIND SPECIFICATION |
| | | HATCHING DENSITY SPECIFICATION |
| BITMAP DRAWING COMMAND | BITMAP DRAWING COMMAND | RASTER DRAWING INITIALIZATION |
| | | COMPRESSION METHOD SPECIFICATION |
| | | RASTER DRAWING RANGE SETTING |
| | | RASTER IMAGE DATA SPECIFICATION |

Fig.5

BASIC LINE IN CAD DRAWING

| THIN LINE [mm] | THICK LINE [mm] | VERY THICK LINE [mm] |
|---|---|---|
| 0.50 | 1.00 | 2.00 |
| 0.35 | 0.70 | 1.40 |
| 0.25 | 0.50 | 1.00 |
| 0.18 | 0.35 | 0.70 |

Fig.6A

REPRESENTATION OF BASIC LINE AT 1,200 [dpi]

| THIN LINE [pixel] | THICK LINE [pixel] | VERY THICK LINE [pixel] |
|---|---|---|
| 24 | 48 | 96 |
| 16 | 32 | 64 |
| 12 | 24 | 48 |
| 6 | 12 | 24 |

Fig.6B

| INK SIGNAL VALUE | INK APPLYING AMOUNT |
|---|---|
| 0 | 0 % |
| ... | ... |
| 100 | 39 % |
| ... | ... |
| 128 | 50 % |
| ... | ... |
| 255 | 100 % |

INK APPLYING AMOUNT 25%  INK APPLYING AMOUNT 50%  INK APPLYING AMOUNT 75%  INK APPLYING AMOUNT 100%

| APPLYING AMOUNT | CORRECTION AMOUNT |
|---|---|
| 20 % | + 0.04 mm |
| 40 % | + 0.01 mm |
| 60 % | − 0.01 mm |
| 80 % | − 0.06 mm |
| 100 % | − 0.07 mm |

Fig.10A

| COLOR OF LINE | | | AFTER POST PROCESSING | | | | APPLYING AMOUNT | CORRECTION AMOUNT |
|---|---|---|---|---|---|---|---|---|
| R | G | B | C | M | Y | K | | |
| 0 | 0 | 0 | 0 | 0 | 0 | 255 | 100 | − 0.07 mm |
| 0 | 0 | 51 | 51 | 51 | 0 | 204 | 120 | − 0.08 mm |
| ... | ... | ... | ... | ... | ... | ... | ... | ... |
| 0 | 0 | 255 | 255 | 255 | 0 | 0 | 200 | − 0.10 mm |
| ... | ... | ... | ... | ... | ... | ... | ... | ... |
| 0 | 255 | 255 | 255 | 0 | 0 | 0 | 100 | − 0.07 mm |
| ... | ... | ... | ... | ... | ... | ... | ... | ... |
| 51 | 51 | 51 | 0 | 0 | 0 | 204 | 80 | − 0.06 mm |
| ... | ... | ... | ... | ... | ... | ... | ... | ... |
| 102 | 102 | 102 | 0 | 0 | 0 | 153 | 60 | − 0.01 mm |
| ... | ... | ... | ... | ... | ... | ... | ... | ... |
| 255 | 0 | 0 | 0 | 255 | 255 | 0 | 200 | − 0.10 mm |
| ... | ... | ... | ... | ... | ... | ... | ... | ... |
| 255 | 255 | 0 | 0 | 0 | 255 | 0 | 100 | − 0.07 mm |
| 255 | 255 | 51 | 0 | 0 | 204 | 0 | 80 | − 0.06 mm |
| 255 | 255 | 102 | 0 | 0 | 153 | 0 | 60 | − 0.01 mm |
| 255 | 255 | 153 | 0 | 0 | 102 | 0 | 40 | +0.01 mm |
| 255 | 255 | 204 | 0 | 0 | 51 | 0 | 20 | +0.04 mm |
| 255 | 255 | 255 | 0 | 0 | 0 | 0 | 0 | 0.00 mm |

Fig.10B

| APPLYING AMOUNT | INPUT LINE WIDTH | CORRECTION AMOUNT | INPUT LINE WIDTH AFTER CORRECTION | NUMBER OF CONSTITUENT PIXELS |
|---|---|---|---|---|
| 20 % | 1.05 mm | + 0.04 mm | 1.09 mm | 51 |
| 40 % | 1.05 mm | + 0.01 mm | 1.06 mm | 50 |
| 60 % | 1.05 mm | − 0.01 mm | 1.04 mm | 49 |
| 80 % | 1.05 mm | − 0.06 mm | 0.90 mm | 42 |
| 100 % | 1.05 mm | − 0.07 mm | 0.80 mm | 38 |

Fig.11

| COLOR OF LINE | | | APPLYING AMOUNT | INPUT LINE WIDTH | OUTPUT LINE WIDTH |
|---|---|---|---|---|---|
| R | G | B | | | |
| 255 | 204 | 255 | 20 % | 1.05 mm | 1.00 mm |
| 255 | 153 | 255 | 40 % | 1.05 mm | 1.02 mm |
| 255 | 102 | 255 | 60 % | 1.05 mm | 1.08 mm |
| 255 | 51 | 255 | 80 % | 1.05 mm | 1.12 mm |
| 255 | 0 | 255 | 100 % | 1.05 mm | 1.13 mm |

Fig.16A

| APPLYING AMOUNT | INPUT LINE WIDTH | CORRECTION AMOUNT |
|---|---|---|
| 20 % | 1.05 mm | + 0.05 mm |
| 40 % | 1.05 mm | + 0.03 mm |
| 60 % | 1.05 mm | − 0.03 mm |
| 80 % | 1.05 mm | − 0.07 mm |
| 100 % | 1.05 mm | − 0.08 mm |

Fig.16B

| COLOR OF LINE | | | APPLYING AMOUNT | INPUT LINE WIDTH | OUTPUT LINE WIDTH |
|---|---|---|---|---|---|
| R | G | B | | | |
| 255 | 204 | 255 | 20 % | 1.05 mm | 1.02 mm |
| 255 | 153 | 255 | 40 % | 1.05 mm | 1.03 mm |
| 255 | 102 | 255 | 60 % | 1.05 mm | 1.06 mm |
| 255 | 51 | 255 | 80 % | 1.05 mm | 1.10 mm |
| 255 | 0 | 255 | 100 % | 1.05 mm | 1.11 mm |

Fig.19A

| COLOR OF LINE | | | APPLYING AMOUNT | CORRECTION AMOUNT (1) | CORRECTION AMOUNT (2) |
|---|---|---|---|---|---|
| R | G | B | | | |
| 255 | 204 | 255 | 20 % | +0.04 mm | +0.01 mm |
| 255 | 153 | 255 | 40 % | +0.01 mm | −0.01 mm |
| 255 | 102 | 255 | 60 % | −0.01 mm | 0.00 mm |
| 255 | 51 | 255 | 80 % | −0.06 mm | −0.01 mm |
| 255 | 0 | 255 | 100 % | −0.07 mm | −0.01 mm |

Fig.19B

| COLOR OF LINE | | | AFTER POST PROCESSING | | | | APPLYING AMOUNT | CORRECTION AMOUNT |
| --- | --- | --- | --- | --- | --- | --- | --- | --- |
| R | G | B | C | M | Y | K | | |
| 0 | 0 | 0 | 0 | 0 | 0 | 255 | 100 | − 0.01 mm |
| 0 | 0 | 51 | 51 | 51 | 0 | 204 | 120 | − 0.01 mm |
| ... | ... | ... | ... | ... | ... | ... | ... | ... |
| 0 | 0 | 255 | 255 | 255 | 0 | 0 | 200 | − 0.01 mm |
| ... | ... | ... | ... | ... | ... | ... | ... | ... |
| 0 | 255 | 255 | 255 | 0 | 0 | 0 | 100 | − 0.01 mm |
| ... | ... | ... | ... | ... | ... | ... | ... | ... |
| 51 | 51 | 51 | 0 | 0 | 0 | 204 | 80 | − 0.01 mm |
| ... | ... | ... | ... | ... | ... | ... | ... | ... |
| 102 | 102 | 102 | 0 | 0 | 0 | 153 | 60 | 0.00 mm |
| ... | ... | ... | ... | ... | ... | ... | ... | ... |
| 255 | 0 | 0 | 0 | 255 | 255 | 0 | 200 | − 0.10 mm |
| ... | ... | ... | ... | ... | ... | ... | ... | ... |
| 255 | 255 | 0 | 0 | 0 | 255 | 0 | 100 | − 0.01 mm |
| 255 | 255 | 51 | 0 | 0 | 204 | 0 | 80 | − 0.01 mm |
| 255 | 255 | 102 | 0 | 0 | 153 | 0 | 60 | − 0.00 mm |
| 255 | 255 | 153 | 0 | 0 | 102 | 0 | 40 | − 0.01 mm |
| 255 | 255 | 204 | 0 | 0 | 51 | 0 | 20 | +0.01 mm |
| 255 | 255 | 255 | 0 | 0 | 0 | 0 | 0 | 0.00 mm |

Fig.20

IMAGE PROCESSING APPARATUS, IMAGE PROCESSING METHOD AND STORAGE MEDIUM, WITH CORRECTION AMOUNT FOR CORRECTING LINE WIDTH IN ACCORDANCE WITH COLOR OF LINE

BACKGROUND OF THE INVENTION

Field of the Invention

The present disclosure relates to an image processing apparatus, an image processing method, and a storage medium.

Description of the Related Art

A printing system is known in which a drawing command is acquired from CAD data created by making use of CAD application software, rasterization processing is performed in accordance with the drawing command, bitmap data including a drawn line is generated, and an image is formed on a printing medium based on the bitmap data. In a drawing that is created by CAD application software, drawing information is described by the thickness of a line and as the case may be, color classification of lines including light and shade, such as gray and black, and color classification of solid-painted portions.

Conventionally, in a case where a drawing created by CAD application software for printing by a certain printing apparatus is printed by another printing apparatus, there is such a problem that the line width for each color is output differently between these printing apparatuses.

In order to solve this problem, in Japanese Patent Laid-Open No. 2012-108569, a combination of a line width and a color is converted before performing printing by an output-target printing apparatus based on image data including a line. Specifically, a combination of a line width and a color is converted so that the average density of the results of printing a line by the output-target printing apparatus coincides with the average density of the results of printing the line by a target printing apparatus (called a target printer and the like).

SUMMARY OF THE INVENTION

In the printing apparatus, the amount of ink to be given per unit area is different in accordance with the color of an input line. For example, the amount of ink to be given per unit area of a line of a pale color is smaller than that of a line of a dark color, and therefore, the number of dots to be applied is small. As a result of this, roughness occurs at the edge portion of the line, and therefore, the line is reproduced as a line whose line width is thinner than that of the input line. Consequently, it is necessary to correct the line width in accordance with the color of the input line.

The present disclosure has been made in view of the above-described problem. An object of the present disclosure is to reduce the difference between a target line width and a width of a line printed by a printing apparatus by correcting the line width in accordance with color information corresponding to the color of the line in a case where an image is printed by the printing apparatus based on image print data including the line.

One embodiment of the present invention is an image processing apparatus having: an acquisition unit configured to acquire a drawing command in which a color and a line width of a line are specified; a determination unit configured to determine a correction amount for correcting the line width specified in the drawing command based on the color of the line specified in the drawing command; and a correction unit configured to correct the line width specified in the drawing command in accordance with the correction amount.

Further features of the present invention will become apparent from the following description of exemplary embodiments with reference to the attached drawings.

BRIEF DESCRIPTION OF THE DRAWINGS

FIG. 5 is a diagram showing details of a drawing command;

FIG. 6A and FIG. 6B are each a table storing data relating to basic lines used in a CAD drawing;

FIG. 10A and FIG. 10B are each a line width correction table in the first embodiment;

FIG. 11 is a diagram for explaining line width correction in the first embodiment;

FIG. 16A and FIG. 16B are diagrams for explaining the second embodiment;

FIG. 19A and FIG. 19B are diagrams for explaining adjustment of a correction amount in a third embodiment; and FIG. 20 is a three-dimensional LUT in the third embodiment.

DESCRIPTION OF THE EMBODIMENTS

In the following, with reference to the attached drawings, preferred embodiments of the present disclosure are explained in detail. However, contents described in the following embodiments are merely exemplary and not intended to limit the scope of the present disclosure only to those.

First Embodiment

<About Configuration of Printing System>

Figure 1:
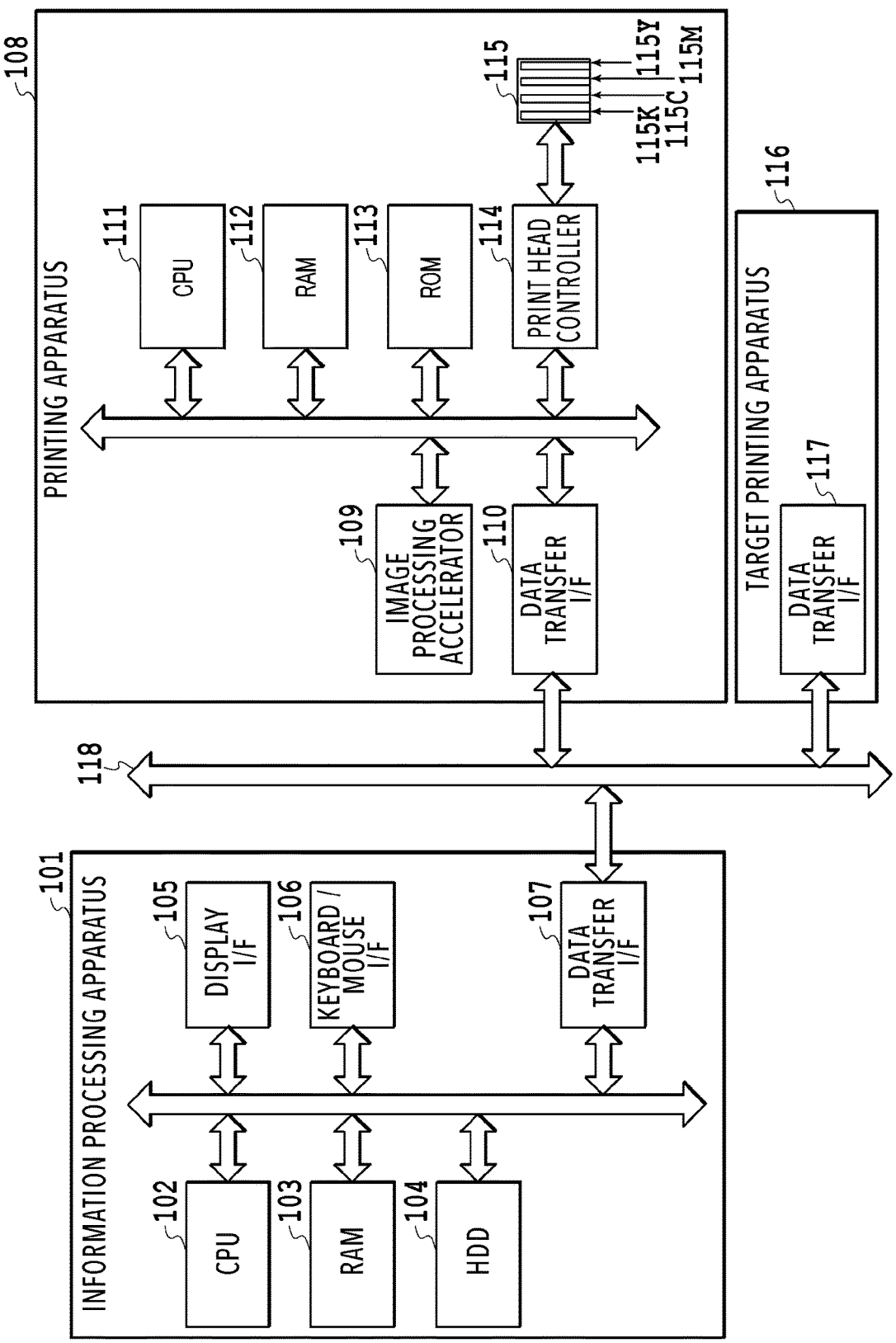
FIG. 1 is a block diagram showing a configuration of a printing system in a first embodiment.

FIG. 1 is a block diagram explaining a configuration of a printing system in the present embodiment. As shown in FIG. 1, the printing system has a host PC (called an information processing apparatus, an image processing apparatus, and the like) 101, a first printing apparatus 108, and a second printing apparatus 116. The second printing apparatus 116 is not used in the present embodiment but is used in a third embodiment. The second printing apparatus 116 is a printing apparatus that is a target in a case where a line width is matched, and therefore, referred to as the target printing apparatus 116 hereinafter.

The information processing apparatus 101 is specifically a host PC, a tablet PC, and the like. In the information processing apparatus 101, a CPU 102 performs various kinds of processing in accordance with programs stored in an HDD 104 by using a RAM 103 as a work area. For example, the CPU 102 receives a command corresponding to instructions a user inputs by using a keyboard, a touch panel (not shown schematically), or the like via a keyboard/mouse interface 106 (hereinafter, interface is abbreviated to I/F). Then, the CPU 102 generates image data (image information) that the printing apparatus 108 can print in accordance with the received command or the programs stored in the HDD 104 and transmits the generated image data to the printing apparatus 108.

Further, the information processing apparatus 101 (CPU 102) performs predetermined processing for the image data received from the printing apparatus 108 via a data transfer I/F 107 in accordance with the programs stored in the HDD 104. The CPU 102 displays a variety of pieces of information, such as the processing results, on a display, not shown schematically, via a display I/F 105. It is possible for the information processing apparatus 101 (CPU 102) to perform the same processing as the processing for the printing apparatus 108 described previously also for the target printing apparatus 116.

On the other hand, in the printing apparatus 108, a CPU 111 performs various kinds of processing in accordance with programs stored in a ROM 113 by using a RAM 112 as a work area. Further, the printing apparatus 108 includes an image processing accelerator 109 for performing high-speed image processing. The image processing accelerator 109 is hardware capable of performing image processing at a speed higher than that of the CPU 111. The image processing accelerator 109 is activated by the CPU 111 writing parameters and data necessary for image processing to a predetermined address. After reading the parameters and data written to the RAM 112, the image processing accelerator 109 performs predetermined image processing for the data. The image processing accelerator 109 is not an indispensable component and it is possible for the CPU 111 to perform equivalent processing without the printing apparatus 108 including the image processing accelerator 109.

The printing apparatus 108 referred to here is a printing apparatus that uses pigment inks of four colors, specifically, pigment inks of KCMY and the ejection amount of each nozzle in a print head 115 is set to 4 [pl]. In contrast to this, the target printing apparatus 116 is a printing apparatus that uses kinds of pigment ink different from those of pigment ink used by the printing apparatus 108 although the target printing apparatus 116 uses the four colors of KCMY and the ejection amount of each nozzle in the print head, not shown schematically, is set to 6 [pl]. The composition of the pigment inks used in the printing apparatus 108 and the composition of the pigment inks used in the target printing apparatus 116 are different, and therefore, even in a case where printing is performed based on identical image data, the color of the output material of the printing apparatus 108 differs from the color of the output material of the target printing apparatus 116. Further, the ejection amount of each nozzle of the target printing apparatus 116 is larger than that of the printing apparatus 108, and therefore, the minimum line width that can be drawn by the target printing apparatus 116 is greater than that by the printing apparatus 108. In the present specification, the ink colors of black, cyan, magenta, and yellow are represented respectively by one letter as K, C, M, and Y. Further, red, green, and blue are represented respectively by one letter as R, and B.

The information processing apparatus 101 is connected with the printing apparatus 108 and the target printing apparatus 116 via a communication line 118. However, the printing apparatus 108 and the target printing apparatus 116 do not need to be connected simultaneously with the information processing apparatus 101 at all times and may be disconnected as needed. Here, as one embodiment, the printing apparatus 108 and the target printing apparatus 116 are described as ink jet printing apparatuses, but these printing apparatuses may be a printing apparatus, such as an electrophotographic printing apparatus, a copy machine, and an LED plotter. Further, here, as one embodiment, the communication line 118 is described as a local area network, but the communication circuit may be a USB hub, a wireless communication network using a wireless access point, a connection using the WiFi Direct communication function.

<About Configuration of Ink Jet Printing Apparatus>

Figure 2A:
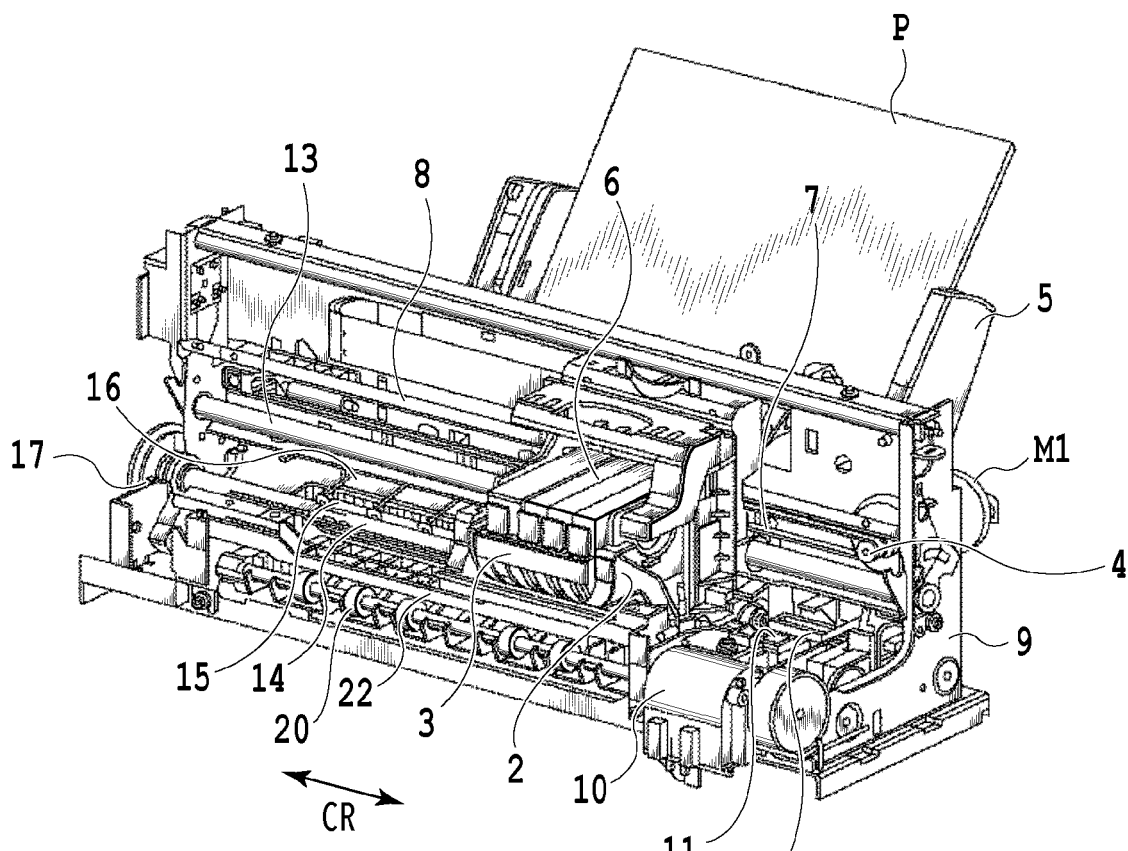
FIG. 2A and FIG. 2B are diagrams showing a configuration of an ink jet printing apparatus in the first embodiment.

FIG. 2A is an outer appearance perspective diagram showing an outline of a mechanical configuration of an ink jet printing apparatus (hereinafter, simply referred to also as printing apparatus) that can be used as the printing apparatus 108 or the target printing apparatus 116 described previously.

The printing apparatus transmits a drive force generated by a carriage motor M1 to a carriage 2 mounting a print head 3 that performs printing by ejecting ink by an ink jet method via a transmission mechanism 4 and causes the carriage 2 to reciprocate in an arrow CR direction. At the same time, by feeding a printing medium P, such as printing paper, by a feed mechanism 5, conveying the printing medium P to a printing position, and ejecting ink to the printing medium P from the print head 3 at the printing position, the printing apparatus performs printing on the printing medium P. Further, the printing apparatus moves the carriage 2 to a recovery device 10 and performs ejection recovery processing of the print head 3 intermittently in order to maintain the print head 3 in a favorable state.

Not only the print head 3 that is mounted on the carriage 2 of the printing apparatus, but also an ink cartridge 6 that stores ink to be supplied to the print head 3 is attached to the carriage 2. The ink cartridge 6 is detachable from the carriage 2. The printing apparatus shown in FIG. 2A is capable of color printing, and therefore, on the carriage 2, four ink cartridges storing black (K), cyan (C), magenta (M), and yellow (Y) inks, respectively, are mounted. These four ink cartridges are detachable independently of one another.

The carriage 2 and the print head 3 are configured so as to be capable of attaining and maintaining a predetermined electrical connection by the joint surfaces of both members being caused to come into contact appropriately. The print head 3 performs printing by selectively ejecting ink from a plurality of ejection ports by applying energy in accordance with a print signal. In particular, the print head 3 of the present embodiment adopts the ink jet method that ejects ink by making use of heat energy and includes an electro-thermal converter for generating heat energy. Ink is ejected from the ejection port by electric energy to be applied to the electro-thermal converter being converted into heat energy and by making use of a change in pressure that occurs by the growth and contraction of bubbles due to film boiling that occurs by giving the heat energy to the ink. The electro-thermal converter is provided in correspondence to each ejection port and ink is ejected from the corresponding ejection port by applying a pulse voltage to the corresponding electro-thermal converter in accordance with the print signal.

As shown in FIG. 2A, the carriage 2 is linked to a part of a drive belt 7 of the transmission mechanism 4 that transmits the drive force of the carriage motor M1 and guided and supported slidably in the arrow CR direction along a guide shaft 13. Consequently, the carriage 2 reciprocates along the guide shaft 13 by forward and reverse rotation of the carriage motor M1. Further, along the movement direction (arrow CR direction) of the carriage 2, a scale 8 for indicating the absolute position of the carriage 2 is provided. In this embodiment, as the scale 8, a transparent PET film on which black bars are printed at a required pitch is used and one end thereof is fixed to a chassis 9 and the other end is supported by a plate spring (not shown schematically).

Further, the printing apparatus is provided with a platen (not shown schematically) facing the ejection port surface on which ejection ports (not shown schematically) of the print head 3 are formed. By giving a print signal to the print head 3 to eject ink at the same time of reciprocating the carriage 2 on which the print head 3 is mounted by the drive force of the carriage motor M1, printing is performed across the entire width of the printing medium P conveyed onto the platen.

The printing apparatus includes a conveyance roller 14, a pinch roller 15, a pinch roller holder 16, and a conveyance roller gear 17. The conveyance roller 14 is driven by a conveyance motor (not shown schematically) in order to convey the printing medium P. The pinch roller 15 causes the printing medium P to abut the conveyance roller 14 by a spring (not shown schematically). The pinch roller holder 16 supports the pinch roller 15 rotatably. The conveyance roller gear 17 is fixed to one end of the conveyance roller 14. The conveyance roller 14 is driven by the force generated by rotation of the conveyance motor, which is transmitted to the conveyance roller gear 17 via an intermediate gear (not shown schematically).

A discharging roller 20 is a roller for discharging the printing medium P on which an image is formed by the print head 3 to the outside of the printing apparatus and driven by the force generated by rotation of the conveyance roller being transmitted. The discharging roller 20 abuts a spur roller (not shown schematically) that presses and contacts the printing medium P by a spring (not shown schematically). A spur holder 22 is a holder for supporting the spur roller rotatably.

Further, in the printing apparatus, a recovery device 10 for recovering an ejection failure of the print head 3 is arranged and installed at a desired position (for example, a position corresponding to the home position) outside the range of the reciprocating motion (outside the printing area) for the printing operation of the carriage 2 mounting the print head 3.

The recovery device 10 includes a capping mechanism 11 that caps the ejection port surface of the print head 3 and a wiping mechanism 12 that cleans the ejection port surface of the print head 3. In an interlocking manner with capping of the ejection port surface by the capping mechanism 11, ink is forcedly discharged from the ejection port by a suction unit (suction pump) within the recovery device 10, and thereby, ejection recovery processing to remove ink having thickened, air bubbles, and the like within the ink flow path of the print head 3 is performed.

Further, at the time of the non-printing operation and the like, it is possible to prevent evaporation and drying of ink as well as protecting the print head 3 by capping the ejection port surface of the print head 3 by the capping mechanism 11. On the other hand, the wiping mechanism 12 is arranged in the vicinity of the capping mechanism 11 and wipes off the ink droplets sticking to the ejection port surface of the print head 3. By the capping mechanism 11 and the wiping mechanism 12, it is made possible to keep normal the ink ejection state of the printer head 3.

<About Configuration of Print Head>

Figure 2B:
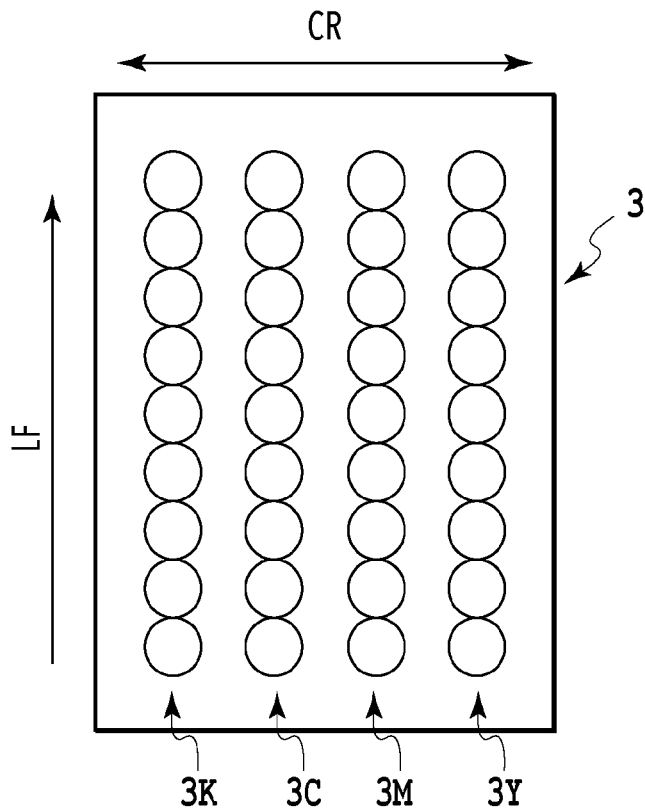

FIG. 2B is a diagram schematically showing the arrangement of each color nozzle column of the print head 3 in the present embodiment and showing the arrangement of the nozzle columns in a case where the print head 3 is viewed from above.

In FIG. 2B, symbols 3K, 3C, 3M, and 3Y indicate the columns (nozzle columns), respectively, each including a plurality of nozzles ejecting ink. Specifically, the nozzle column 3K indicates the nozzle column including nozzles ejecting K ink, the nozzle column 3C indicates the nozzle column including nozzles ejecting C ink, the nozzle column 3M indicates the nozzle column including nozzles ejecting M ink, and the nozzle column 3Y indicates the nozzle column including nozzles ejecting Y ink. The plurality of nozzle columns is arranged side by side in the lateral direction intersecting the direction in which the nozzles are arrayed, and therefore, the print head having the nozzle configuration such as this is called the lateral configuration head. In the configuration shown schematically, the number of nozzles configuring each color nozzle column is equal and it may also be possible to include an arbitrary number of nozzles, for example, such as 256.

The arrangement of the nozzle columns of the print head is not limited to the example shown in FIG. 2B and a variety of aspects can be used, such as an aspect in which the arrangement order is different or the number of nozzles included in each column is different. Further, FIG. 2B shows the print head in the aspect in which each color nozzle column is formed integrally on one chip, but a print head in an aspect in which each color nozzle column is formed separately on a different chip may be accepted. Further, a print head in an aspect in which the nozzle column of certain one color (for example, K) of the four colors (CMYK) and the nozzle columns of the other three colors (for example, CMY) are formed on separate chips may be accepted.

<About Flow of Image Data Conversion Processing>

Figure 3:
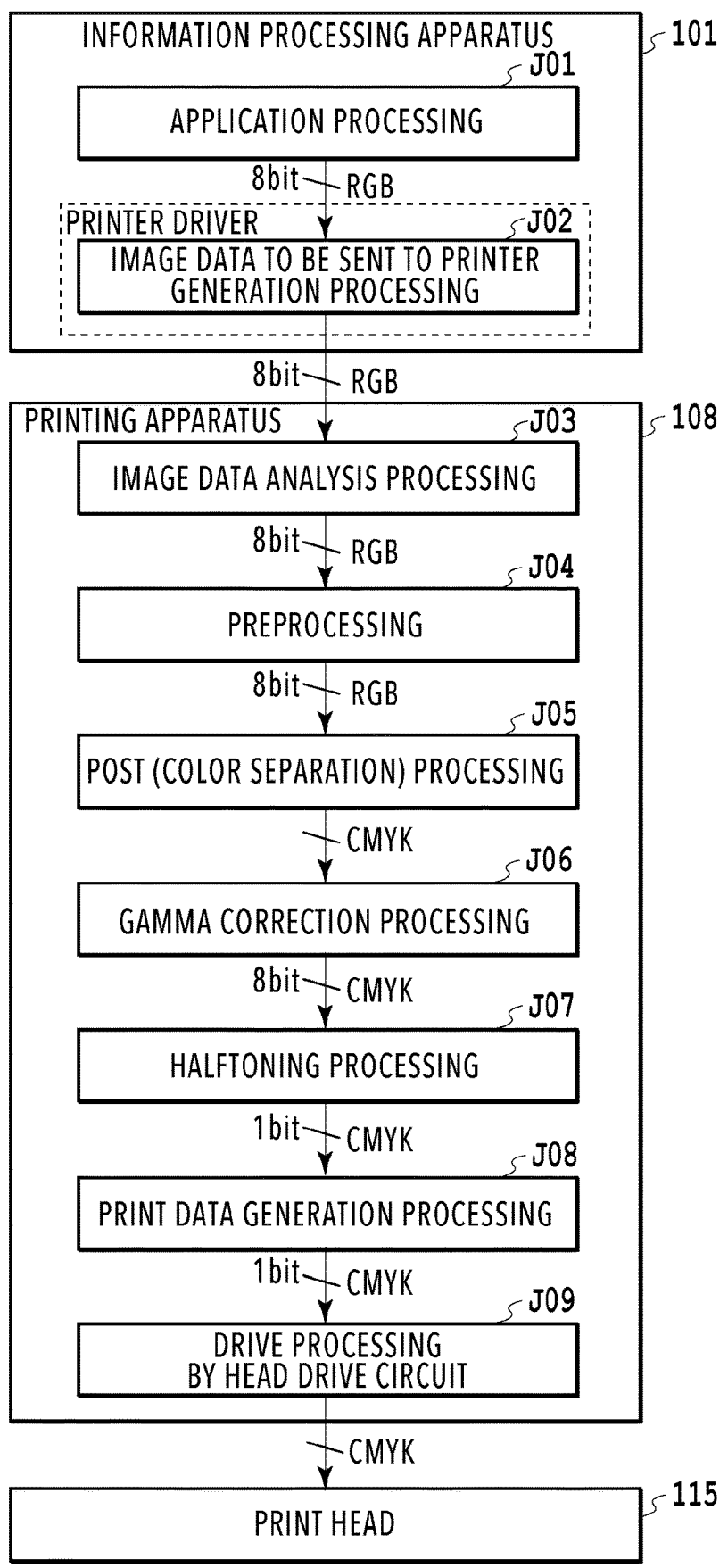
FIG. 3 is a diagram showing a flow of image data conversion processing in the first embodiment.

FIG. 3 is a diagram showing a flow of image data conversion processing in the present embodiment. In the following, processing in the printing apparatus 108 is described, but it is also possible to perform the same processing in the target printing apparatus 116.

The printing apparatus 108 prints an image on a printing medium by using four color inks of cyan, magenta, yellow, and black. The print head 115 has nozzle columns 115C, 115M, 115Y, and 115K ejecting the four color inks respectively. As shown in FIG. 3, each piece of image processing in the printing system is performed by one of the information processing apparatus 101 and the printing apparatus 108, each functioning as an image processing apparatus.

As a program that runs on the operating system (OS) of the information processing apparatus 101, there is an application or a printer driver. As the application, there is, for example, an application for creating a CAD drawing. In application processing J01, processing to generate image data corresponding to an image to be printed by the printing apparatus 108 is performed by the application. The image data generated in the application processing J01 is delivered to the printer driver.

The printer driver installed in the information processing apparatus 101 generates image data in the PDL (Page-Description Language) format as image data. In the present specification, image data in the PDL format is described simply as PDL data. PDL is an abbreviation of Page Description Language. As an example of PDL, "PDF" and "PostScript" of Adobe Systems, "HPGL/2" of Hewlett-Packard Enterprise, and the like are known. PDL is widely used as the image format capable of describing vector data of lines, characters, and the like, not only bitmaps.

The printer driver performs processing to generate image data to be sent to printer, which is PDL data, that is, so-called image data to be sent to printer generation processing J02, based on the image data delivered from the application. The printer driver generates image data to be sent to printer by adding a header portion including setting information and the like relating to printing, which is set by a user via a user interface (UI) of the information processing apparatus 101, to the image data delivered from the application. The generated image data to be sent to printer is sent to the printing apparatus 108 via the data transfer I/F 107 of the information processing apparatus 101 and stored in the RAM 112 via the data transfer I/F 110 of the printing apparatus 108.

<<About Rasterization from PDL Format Image Data into Raster Image Data>>

Figure 4A:
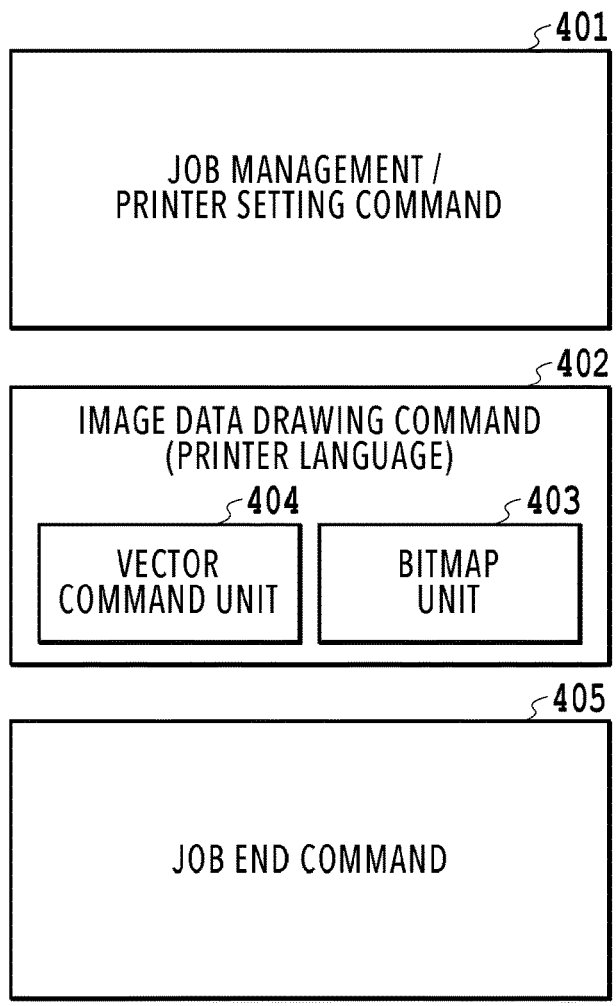
FIG. 4A and FIG. 4B are diagrams showing a PDL format.
Figure 4B:
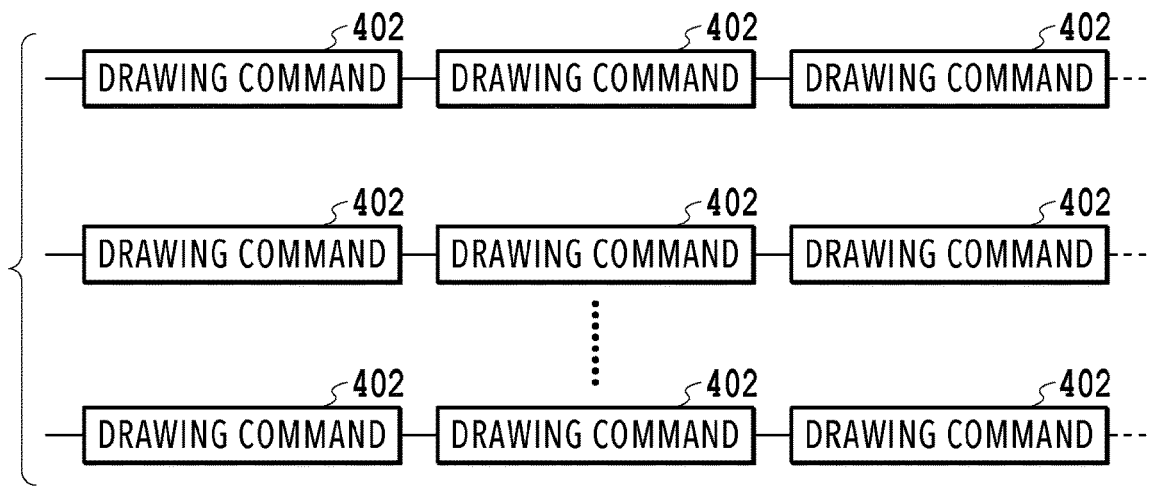

Here, conversion (rasterization) from PDL format image data into raster image data is explained by using FIG. 4A, FIG. 4B, and FIG. 5.

FIG. 4A is a diagram showing an example of the PDL format. The PDL format includes a job management/printer setting command 401, an image data drawing command 402, and a job end command 405. The image data drawing command 402 includes a vector command unit 404, in addition to a bitmap unit 403, and has the format capable of representing figures, such as characters and lines, not only bitmaps. FIG. 4B is a diagram explaining the image data drawing command 402. The image data drawing command 402 has a configuration in which a plurality of series of the drawing commands 402 for each certain unit (here, 64 [KB]), which is called a display list (DL), is bundled.

FIG. 5 is a command list table explaining details of the drawing command 402. By referring to FIG. 5, it is known that the drawing command 402 is roughly divided into a "bitmap drawing command" and a "vector drawing command". Further, the vector drawing command is divided into a "line drawing command" relating to the color of a pen, the line width, drawing, and the like, a "character drawing command" specifying the character font and the character itself, and a "hatching drawing command" specifying the kind and density of hatching. Image data (PDL data) in the PDL format as shown in FIG. 4A, FIG. 4B, and FIG. 5 is sent from the information processing apparatus 101 to the printing apparatus 108.

The CPU 111 of the printing apparatus 108 functions as an image processing unit and performs image data analysis processing J03. In the image data analysis processing J03, image data in the PDL format (PDL data) is sequentially read from the RAM 112 functioning as a data buffer. Then, the CPU 111 interprets the drawing command included in the PDL data, rasterizes the image data in the PDL format (PDL data) into raster image data in the same format as that of a bitmap, and stores the rasterized raster image data in the RAM 112.

As an example, the results of performing rasterization processing for the basic lines in a CAD drawing are shown in FIG. 6A and FIG. 6B. FIG. 6A is a table storing data relating to the basic lines frequently used in a case where a CAD drawing is created. As shown in FIG. 6A, as the basic lines, a thin line, a thick line, and a very thick line whose line widths are in a ratio of 1:2:4 are used. For example, in a case where the thin line is 0.25 [mm] wide, the thick line is 0.50 [mm] wide and the very thick line is 1.00 [mm] wide. In the other rows of the table in FIG. 6A, data relating to the basic lines having other thicknesses is described. FIG. 6B shows how the basic lines are represented in a case where they are represented at 1,200 [dpi] as the results of performing the rasterization processing for the basic lines shown in FIG. 6A. For example, in a case where the thin line is 0.50 [mm] wide, the thin line is represented by 24 [pixel], in a case where the thick line is 1.00 [mm] wide, the thick line is represented by 48 [pixel], and in a case where the very thick line is 2.00 [mm] wide, the very thick line is represented by 96 [pixel].

For the rasterized raster image data, the image processing by the CPU 111 is performed continuously. In the present embodiment, in the image data analysis processing J03, adjustment of the line width for matching the input line width [mm] on the image data with the width of a line on the printed matter (output line width [mm]) reproduced by the printing apparatus 108 is performed. Details of the line width adjustment method will be described later.

<<About Preprocessing J04 and Subsequent Processing>>

Explanation is returned to the image data conversion processing. In the CPU 111 that functions as the image processing unit, preprocessing J04 to perform color matching between models, post processing J05, gamma correction processing J06, halftoning processing J07, which is quantization (specifically, binarization), and print data generation processing J08 are performed. In the following, each piece of processing is explained.

In the preprocessing J04, for example, as processing to absorb a difference between the color represented in the sRGB color space and the color represented by the printing apparatus 108, mapping for matching colors between models is performed. That is, data conversion for mapping the image data of the sRGB standard within a device-dependent color gamut reproduced by the printing apparatus 108 is performed. Specifically, by referring to a three-dimensional lookup table (three-dimensional LUT), the data in which each of R, G, and B is represented by eight bits is converted into the data in which each of R, G, and B is represented by eight bits, which depends on the color gamut that can be represented by the printing apparatus 108.

In the post processing J05, processing to convert the 3-channel (R, G, B) data represented by eight bits obtained by the preprocessing J04 into data (here, 4-channel (C, M, Y, K) data represented by eight bits) corresponding to combinations of ink colors that reproduce the colors represented by the data is performed. This conversion processing is called color separation processing. In the post (color separation) processing J05, a conversion table (for example, three-dimensional LUT) in which the RGB data and the CMYK data are associated with each other in a one-to-one manner is used. The CPU 111 converts the RGB data into the CMYK data by referring to the conversion table. For example, combinations of each value of R, G, and B, each being represented by eight bits (0 to 255), and combinations of each value of C, M, Y, and K, each being represented by eight bits (0 to 255), are associated with each other in advance in the three-dimensional LUT. Then, conversion from (R, G, B)=(0 to 255, 0 to 255, 0 to 255) into (C, M, Y, K)=(0 to 255, 0 to 255, 0 to 255, 0 to 255) is performed.

For example, in a case where (R, G, B)=(0, 0, 0), this is converted into (C, M, Y, K)=(0, 0, 0, 255). Further, in a case where (R, G, B)=(255, 255, 255), this is converted into (C, M, Y, K)=(0, 0, 0, 0). Furthermore, in a case where (R, G, B)=(0, 0, 255), this is converted into (C, M, Y, K)=(255, 255, 0, 0).

It is possible to find the color separation data by, for example, an equation as follows.

$$K=255-\mathrm{MAX}(R,G,B)$$

$$C=255-R-K$$

$$M=255-G-K$$

$$Y=255-B-K$$

In the gamma correction processing J06, tone value conversion is performed for each piece of ink color data configuring the color separation data (CMYK data) obtained by the post processing J05. Specifically, by using a one-dimensional LUT in accordance with the tone characteristic of each color ink of the printing apparatus 108, conversion by which the color separation data is associated linearly with the tone characteristic of the printing apparatus 108 is performed.

In the halftoning processing J07, quantization processing for each piece of ink color data configuring the color separation data, specifically, quantization processing to convert the 8-bit data of each ink color of C, M, Y, and K into 1-bit data is performed. In the present embodiment, processing to convert the 8-bit data of 256 tones into 1-bit data of two tones by using the binary dither method is performed.

In the print data generation processing J08, print data is generated, which is the print image data having 1-bit (binary) dot data as contents to which printing control information is added. The generated print data is stored in the RAM 112. The binary data stored in the RAM 112 is sequentially read by the CPU 111, input to the head drive circuit, and drive processing J09 is performed. In the drive processing J09, 1-bit data of each ink color, which is input to the head drive circuit, is converted into a drive pulse of the print head 115 and ink is ejected at predetermined timing. The above is the contents of the flow of the image data conversion processing in the present embodiment.

<About Ink Applying Amount, Degree of Reproduction of Line Width that Changes in Accordance with Ink Applying Amount>

In the following, before explaining line width correction in the present embodiment, the ink applying amount given onto the paper surface and the degree of reproduction of the line width that changes in accordance with the applying amount are explained.

Figures 7A, 7B:
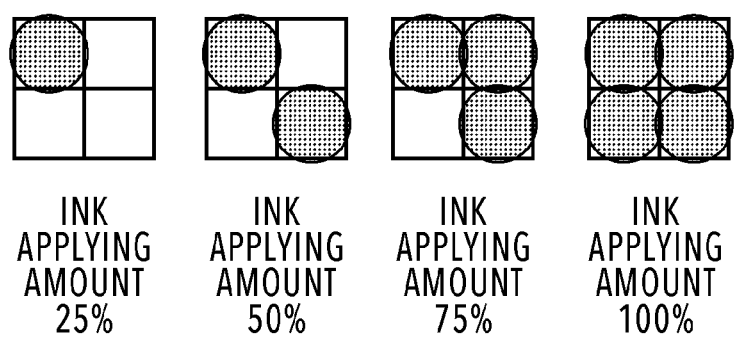
FIG. 7A and FIG. 7B are diagrams for explaining an ink applying amount.

First, the ink applying amount is explained by using FIG. 7A and FIG. 7B. FIG. 7A is a diagram showing a relationship between the ink signal value (here, represented by eight bits for each of C, M, Y, K) included in the color separation data obtained by the post (color separation) processing J05 described previously and the ink applying amount per unit area. In FIG. 7A, the ink signal value 0 corresponds to the ink applying amount 0% and the ink signal value 255 corresponds to the ink applying amount 100%. The number of dots of ink to be applied per unit area is determined in accordance with the ink signal value based on the relationship as shown in FIG. 7A. For example, as shown in FIG. 7B, an area of 1,200 dpi×1,200 dpi is taken to be the unit area and the applying amount in a case where one ink droplet is printed in this unit area is defined as 25%. Similarly, the applying amount in a case where two ink droplets are printed is defined as 50%, the applying amount in a case where three ink droplets are printed is defined as 75%, and the applying amount in a case where four ink droplets are printed is defined as 100%, respectively. It is made possible to control the ink applying amount of each ink color in accordance with the ink signal value of each color included in the color separation data obtained by the post (color separation) processing J05 as described above.

Figure 8A:
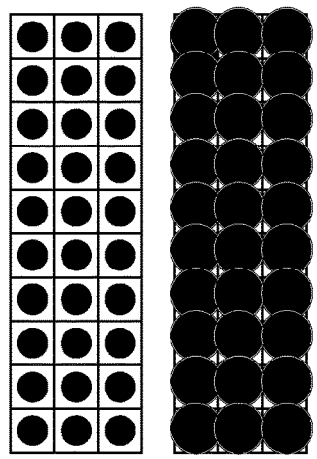
FIG. 8A to FIG. 8C are diagrams for explaining degrees of reproduction of a line width that changes in accordance with an ink applying amount.
Figure 8B:
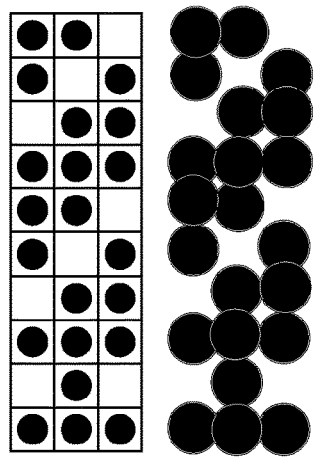
Figure 8C:
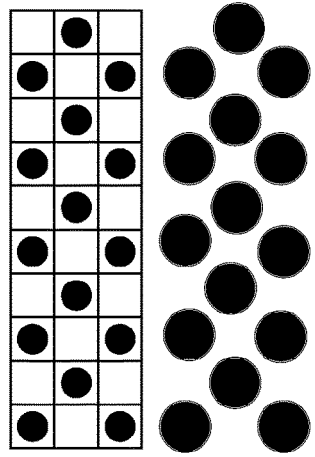

Next, the degree of reproduction of the line width that changes in accordance with the ink applying amount is explained by using FIG. 8A to FIG. 8C. FIG. 8A shows a case where the applying amount is 100%, FIG. 8B shows a case where the applying amount is 75%, and FIG. 8C shows a case where the applying amount is 50%, respectively. In each of FIG. 8A to FIG. 8C, the diagram on the left side shows dot arrangement after the halftoning processing J07 is applied and on the other hand, the diagram on the right side is a diagram in a case where ink droplets are arranged on the paper surface.

As shown in the diagrams on the right side in FIG. 8A to FIG. 8C, each ink droplet arranged on the paper surface blurs and the ink droplet spreads. For example, as the results of spread of the dot, the diameter of one dot becomes 30 to 40 μm and larger than the width of one pixel (=21 μm) at 1,200 dpi. Consequently, in a case where the applying amount is 100%, as shown in FIG. 8A, the line width on the printed matter (referred to as output line width) becomes wider than the input line width on the image data. On the other hand, in a case where the applying amount is 50%, as shown in FIG. 8C, the loss of dots configuring the line occurs. The line such as this is observed as a visually thin line by a person resulting from the lack of edge portions of the line.

Figure 9:
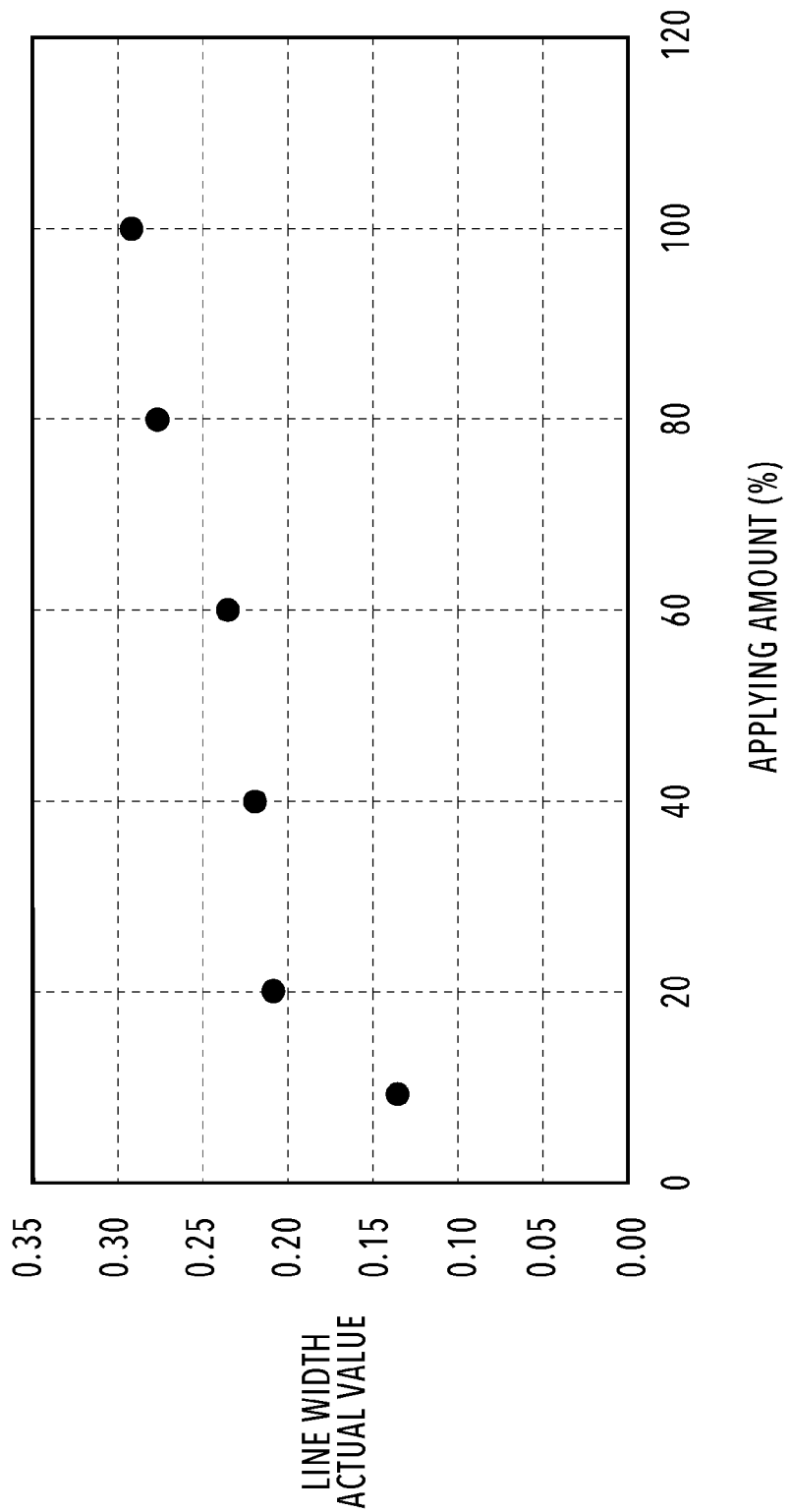
FIG. 9 is a diagram showing a relationship between the applying amount and the line width actual value.

FIG. 9 is a diagram showing a relationship between the applying amount [%] and the line width actual value in a case where applying amount is changed for the input line width having a specified value of 0.2 [mm]. From FIG. 9, it is known that the line width is thin in the area where the applying amount is small and the line width is thick in the area where the applying amount is large. By the above results, despite the lines of equal width in the original image data, it is estimated that the line whose color is pale, that is, the line whose ink applying amount per unit area is relatively small is thin in the line width on the printed matter and the line whose color is dark, that is, the line whose ink applying amount per unit area is relatively large is thick in the line width on the printed matter. Consequently, in a case where the line width is corrected, it is possible to improve the correction accuracy by changing the correction amount based on the information indicating the color of the line.

<About Correction of Line Width>

In the following, the line width correction for each color in the present embodiment, specifically, a method of correcting the input line width, which is set in a case where a drawing is created by CAD application software and the like, based on the information indicating the color of the line at the time of performing printing by the printing apparatus 108 is explained. By performing printing by the printing apparatus 108 in accordance with the value of the corrected input line width, it is possible to suppress the difference between the input line width and the output line width.

First, as one embodiment, a method of preparing in advance a table used for line width correction (referred to as line width correction table) is explained. The line width correction table in the present embodiment stores each value of the applying amount and the correction amount of the input line width for the applying amount. FIG. 10A is a diagram showing an example of the line width correction table and the correction amount of the input line width corresponding to each applying amount is stored. This line width correction table is a table storing the correction amount for each applying amount for an input line width of 1.0 [mm]. However, it may also be possible to prepare a table for each input line width, for example, a table for an input line width of 0.5 [mm], a table for an input line width of 1.0 [mm], a table for an input line width of 1.5 [mm], and so on.

By analyzing the input PDL data described previously and referring to the line width correction table, it is possible to determine the correction amount corresponding to the line based on each value of the input line width and the color of the line specified within the PDL data. For example, in a case of a line whose input line width is 1.0 [mm] and whose color value is (R, G, B)=(102, 102, 102), it is possible to convert this into (C, M, Y, K)=(0, 0, 0, 153) in the post processing J05 and uniquely drive an applying amount of 60% corresponding to this. Then, by referring to the table in FIG. 10A, it is possible to find a correction amount of −0.01 [mm] corresponding to the derived applying amount of 60%. In a case where the table for each input line width is prepared, for example, in a case where the tables for input line widths of 0.5 [mm], 1.0 [mm], 1.5 [mm], and so on, are prepared, it is possible to determine the correction amount for each input line width and for each applying amount, and therefore, it is possible to further improve the correction accuracy. A specific correction method of actually applying the correction amount explained here to the input line width will be described later.

Further, as another embodiment, it may also be possible to prepare a three-dimensional LUT in advance in place of the one-dimensional LUT storing the correction amount in accordance with the applying amount as in FIG. 10A.

FIG. 10B is a diagram showing an example of the three-dimensional LUT such as this and in this table, each value of the applying amount and the correction amount for each color (combination of each value of RGB) of the line is stored. The applying amount corresponding to the color specified by the combination of each value of RGB or the like is calculated in advance and the calculated applying amount is stored in the three-dimensional LUT such as this. Then, for example, in a case where the value indicating the color of the line specified within the input PDL data is (R, G, B)=(51, 51, 51), it is possible to find a correction amount of −0.06 [mm] by referring to the table in FIG. 10B.

From FIG. 10B, it is known that for the color (R, G, B) of the line, the (C, M, Y, K) value after the post processing is different and the applying amount is different in accordance with each combination. For example, (R, G, B)=(0, 255, 255) is the so-called primary color, that is, only the cyan ink (C) is used and similarly, (R, G, B)=(255, 255, 0) is the so-called primary color, that is, only the yellow ink (Y) is used. Then, the applying amount is 100% for both and the correction amount is −0.07 [mm]. Further, (R, G, B)=(0, 0, 255) is the secondary color, that is, the cyan ink (C) and the magenta ink (M) are used and similarly, (R, G, B)=(255, 0, 0) is the secondary color, that is, the magenta ink (M) and the yellow ink (Y) are used. Then, the applying amount for both is 200%, larger than that for the primary color and the correction amount is −0.10 [mm]. Further, for the black point of (R, G, B)=(0, 0, 0), only the black ink (K) is used, the applying amount is 100%, and the correction amount is −0.07 [mm].

As described above, in color separation, the amount of ink to be used of the secondary color is larger than that of the primary color that uses a single color. In the present embodiment, by storing the correction amount table in the three-dimensional LUT format as described above, it is possible to perform highly accurate correction for each color. Further, it is possible to perform correction in a simple manner by simplifying the configuration, for example, by handling the ink by dividing into two kinds, that is, the primary color and the secondary color, or dividing into two kinds, that is, black and color. By the configuration such as this, it is no longer necessary to secure a memory for storing the three-dimensional LUT within the image processing apparatus and it is made possible to perform processing while suppressing the apparatus cost.

Further, in this table, irrespective of the ink color configuring the color of a line, the correction amount is set in accordance with the applying amount of the ink to be used. However, depending on the type of ink, the permeance property for a printing medium is different and the way ink blurs on a printing medium is different. Because of this, a configuration may be accepted in which the correction amount is changed depending on the ink color. For example, in the color material of the magenta dye, the molecular weight of the dye molecule is lower than that in the color material of the cyan dye and the molecule is likely to move also on a printing medium, and therefore, there is a tendency for the color material of the magenta dye to blur. In the case such as this, it may also be possible to prepare a table in which the correction amount of the color that uses the magenta ink is larger than that of the color that does not use the magenta ink.

This line width correction table is a table for an input line width of 1.0 [mm]. However, it may also be possible to prepare the three-dimensional LUT for each input line width, for example, such as a table for an input line width of 0.5 [mm], a table for an input line width of 1.0 [mm], and a table for an input line width of 1.5 [mm]. In a case where the table for each input line width is prepared, such as the table for each of an input line width of 0.5 [mm], an input line width of 1.0 [mm], an input line width of 1.5 [mm], and the like, it is possible to determine the correction amount for each input line width and for each applying amount, and therefore, it is possible to further improve the correction accuracy.

Further, as another embodiment, an aspect is considered in which the input line width is corrected in accordance with the correction amount in accordance with the degree of the applying amount in place of preparing the table as shown in FIG. 10A or FIG. 10B. As explained previously by using FIG. 8A to FIG. 8C, the line becomes thin or thick in accordance with the degree of the applying amount, and therefore, the correction amount according to the degree of the applying amount is set. Specifically, there is a tendency for the line whose applying amount is small to become thin for the input line width, and therefore, the correction amount that increases the input line width is set to the line such as this. On the other hand, there is a tendency for the line whose applying amount is large to become thick for the input line width, and therefore, it is sufficient to set the correction amount that reduces the input line width to the line such as this. Then, it is possible to appropriately correct the line width by switching and using the correction amounts in accordance with the applying amount corresponding to the input color of the line.

Further, as another embodiment, it may also be possible to determine one correction amount that takes into consideration the applying amounts of all the input colors printed by the printing apparatus 108. For example, in a case where the applying amount is set large on the whole in the color separation data obtained by the post processing J05, the line width is likely to become thick for the input color and on the other hand, in a case where the applying amount is set small on the whole, the line width is likely to become thin for the input color. Consequently, in the color separation data, in a case where the applying amount is set large on the whole, it is also possible to set one correction amount that reduces the input line width and on the other hand, to set one correction amount that increases the input line width in a case where the applying amount is set small on the whole. It is possible to correct the line widths of all the colors by using the correction amount thus set. As a method of finding one correction amount to be set, it may also be possible to adopt an arbitrary method, such as a method of averaging the correction amounts.

<About Processing to Correct Input Line Width in Accordance with Correction Amount>

In the following, the line width correction processing in the present embodiment, in detail, processing to correct the input line width by applying the correction amount described previously is explained by using FIG. 11.

In the present embodiment, in the image data analysis processing J03 (see FIG. 3), the processing to correct the input line width by applying the correction amount is performed. In the image data analysis processing J03, first, PDL data is received. Next, the CPU 111 or the image processing accelerator 109 analyzes a drawing command in the received PDL data. Next, the CPU 111 or the image processing accelerator 109 determines whether the drawing target is a line portion. In a case where the determination results are affirmative, the CPU 111 or the image processing accelerator 109 performs line width correction. In detail, a correction amount that is used is found based on the color value or the like of the line specified in the drawing command by referring to the line width correction table as shown in FIG. 10A or FIG. 10B, and the like. Then, the value of the input line width specified in the drawing command is changed to a value (referred to as input line width after correction) calculated by adding the correction amount to the value.

FIG. 11 is a table storing data of the results of performing the line width correction in the present embodiment and in the table, the results of applying the correction amount corresponding to each value of applying amounts of 20%, 40%, 60%, 80%, and 100% for an input line width of 1.05 [mm] are described.

After the line width correction, the rasterization processing is performed for the line whose input line width is corrected. Due to this, the drawing-target line object is rasterized into raster image data similar to a bitmap.

In the rasterization processing, the value of the input line width after correction is converted into the number of pixels configuring the line width. This number of pixels is calculated by using a mathematical equation, such as input line width after correction [mm]/0.021 [mm] and rounding down the quotient to the nearest whole number. FIG. 11 shows a case where the input line width is 1.05 [mm] and the number of pixels corresponding to the line width of 1.05 [mm] is 50. In the item of the number of pixels in the table in FIG. 11, data relating to the number of pixels configuring the line width in a case where the rasterization processing is performed for the line object having the input line width after correction is stored. As shown in FIG. 11, by using the correction amount, it is possible to control the number of pixels configuration the line, and therefore, it is made possible to correct the line width.

In a case where the three-dimensional LUT described previously is used as the line width correction table, it is possible to similarly correct the line width by applying the correction amount for the color of the line.

Further, in a case where the correction amount in accordance with the degree of the applying amount is adopted, it is sufficient to derive the applying amount for each input color of the line and correct the line width in accordance with the correction amount determined based on the magnitude relationship between the applying amount and an arbitrary threshold value.

Furthermore, in a case where one correction amount that takes into consideration the applying amounts of all the input colors specified in the print data is adopted, it is sufficient to correct the line width in accordance with the one correction amount for the lines of all the colors. The above is the contents of the processing to correct the input line width in accordance with the correction amount in the present embodiment.

About Effect of the Present Embodiment

Figure 12A:
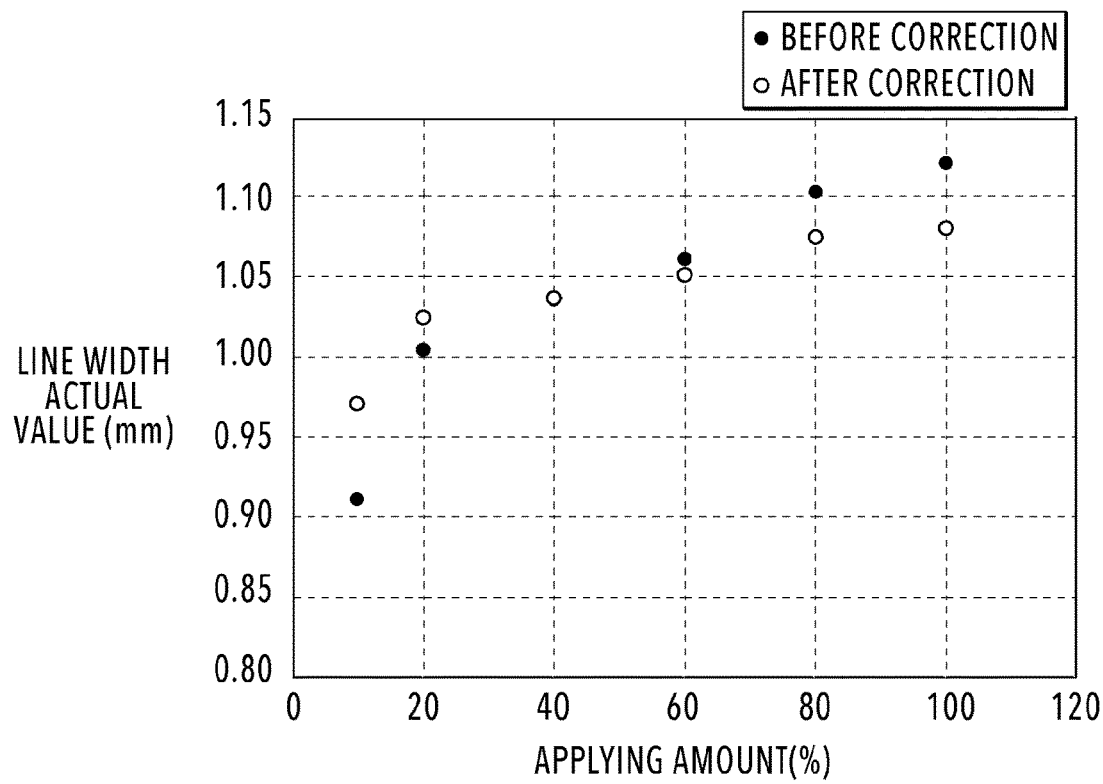
FIG. 12A and FIG. 12B are diagrams for explaining effects of the first embodiment.

In the following, the effect of the present embodiment is explained by using FIG. 12A and FIG. 12B. FIG. 12A shows a relationship between the applying amount [%] and the output line width [mm] by the printing apparatus 108 in a case where the specified value of the input line width is 1.05 [mm]. The black circle in FIG. 12A indicates the output line width by the printing apparatus 108 in a case where the correction in the present embodiment is not performed and it is known that the difference between the specified value and the actual value [mm] is different for each applying amount for the specified value of 1.05 [mm]. In contrast to this, the white circle in FIG. 12A indicates the output line width by the printing apparatus 108 in a case where the correction is performed by using the line width correction table shown in FIG. 10A and it is known that the output line width after correction is closer to the specified value of 1.05 [mm] than that before correction for each applying amount.

Figure 12B:
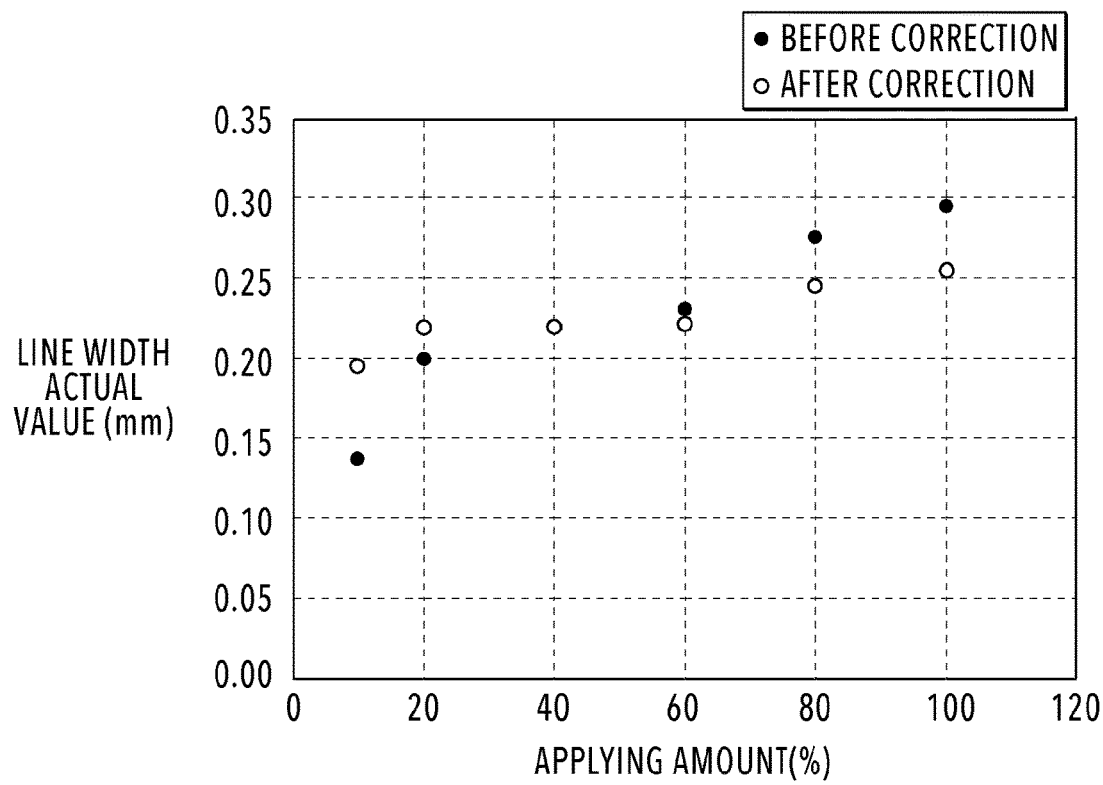

Further, FIG. 12B shows a relationship between the applying amount [%] and the output line width by the printing apparatus 108 in a case where the specified value of the input line width is 0.21 [mm]. The black circle in FIG. 12B indicates the output line width by the printing apparatus 108 in a case where the correction in the present embodiment is not performed and it is known that the difference between the specified value and the actual value [mm] is different for each applying amount for the specified value of 0.21 [mm]. In contrast to this, the white circle in FIG. 12B indicates the output line width by the printing apparatus 108 in a case where the correction is performed by using the line width correction table shown in FIG. 10A.

As described above, by performing the line width correction in accordance with the applying amount per unit area, it is possible to put the output line width close to the input line width irrespective of the input line width. It is needless to say that the correction accuracy improves by preparing the line width correction table for each specified value of the input line width and selectively using the line width correction table in accordance with the specified value.

As described above, according to the present embodiment, by correcting the line width on the image data by using an optimum correction amount in accordance with the information indicating the color of the line, it is made possible to match the line width on the image data with the line width on the printed matter.

Second Embodiment

In the first embodiment, the method of performing the line width correction in accordance with the information indicating the color of the line in accordance with the correction amount stored in advance by using the table or the like is explained. In the present embodiment, a method of performing line width correction by also taking into consideration the characteristic of a printing medium is explained. In the following, explanation of the same contents as those of the embodiment described previously is omitted appropriately.

<About Degree of Reproduction of Line Width that Changes in Accordance with Printing Medium>

The degree of reproduction of a line width is different depending on a printing medium, and therefore, in a case where line width correction is performed by using the line width correction table explained in the first embodiment, there is a concern that correction is too much. The main cause of this is the difference in the ink permeation speed for each printing medium. This is explained by using FIG. 13A, FIG. 13B, and FIG. 14.

Figure 13A:
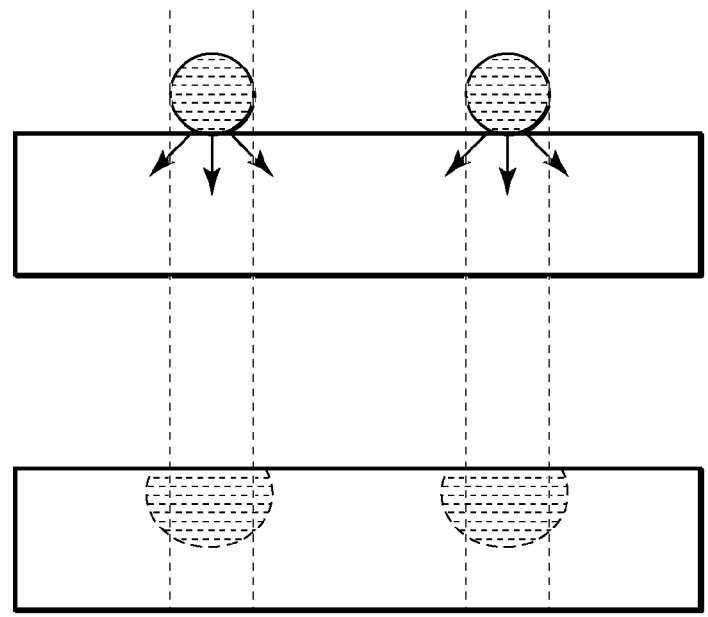
FIG. 13A and FIG. 13B are diagrams for explaining a permeation speed and the way a dot spreads, which are different for different printing media.
Figure 13B:
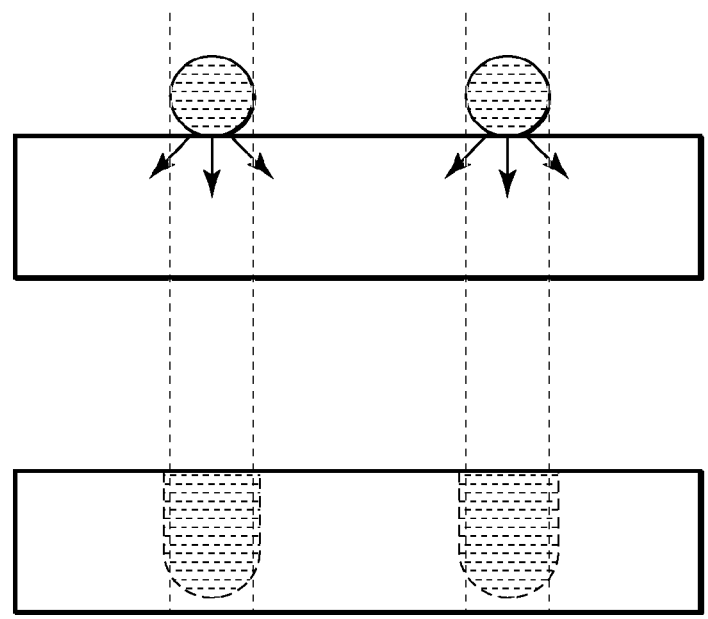

FIG. 13A shows a case where ink permeates into glossy paper, which is a printing medium whose permeation speed is relatively slow, and FIG. 13B shows a case where ink permeates into matte paper, which is a printing medium whose permeation speed is relatively high. Permeation of ink into the paper surface is explained by a capillary phenomenon. In glossy paper, ink permeation takes place relatively slowly with a uniform ink receiving layer (absorbing layer) being taken to be uniform capillaries. In coated paper, an ink receiving layer consisting of silica particles having a large particle diameter is used. The coat layer of coated paper includes thick capillaries whose volume is large and whose permeation speed is high, which consists of gaps between the silica particles having a large particle diameter, and thin capillaries inside the silica particles. In the coat layer, ink permeates at a high speed through the thick capillary of the gap between silica particles. In a case of plain paper, ink permeation is explained by taking the vacant space of the pulp fiber as the thick capillary and permeation into the pulp fiber as the thin capillary. As shown in FIG. 13A, in a case where the ink permeation speed is slow, the spread of a dot is large. The reason is that the ink permeation speed is slow, and therefore, it takes time for the ink to spread in a wetting manner. On the other hand, in a case where the ink permeation speed is high, as shown in FIG. 13B, the spread of a dot is small. The reason is that the ink permeation speed is high, and therefore, the time taken by the ink spreading in a wetting manner is short.

Figure 14:
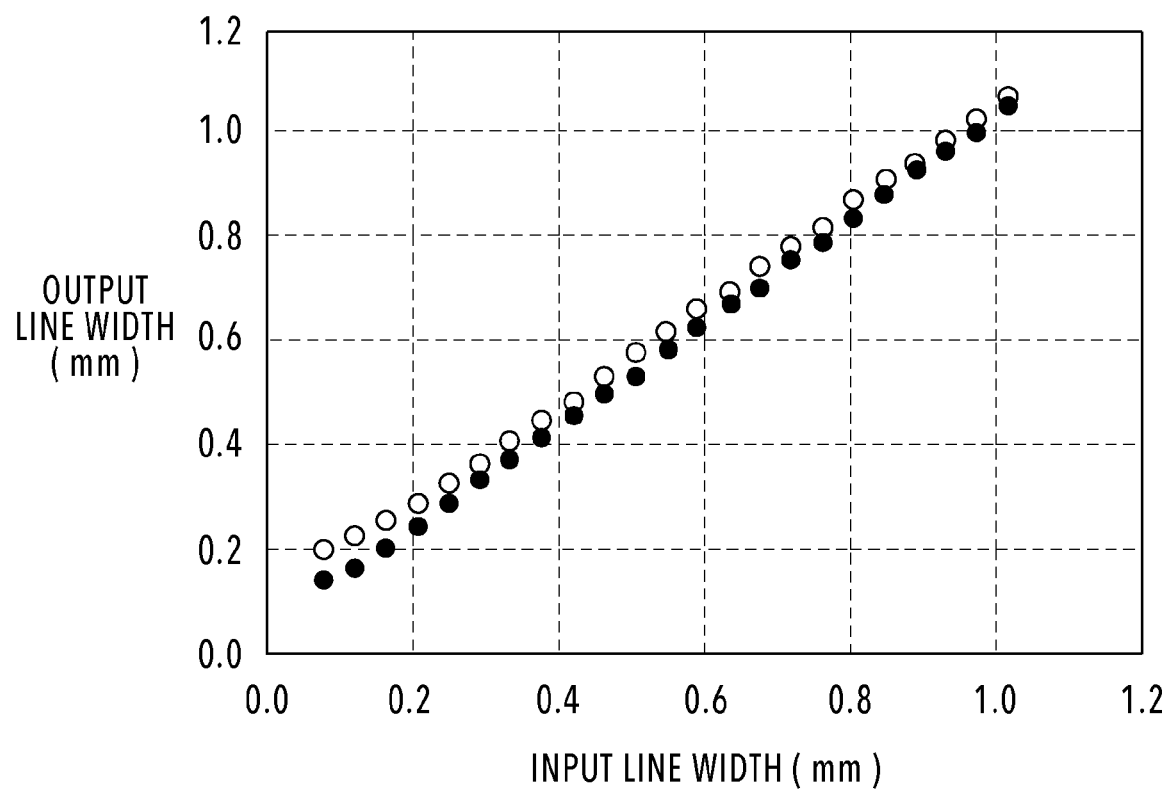
FIG. 14 is a diagram showing the results of printing lines of equal line width on two kinds of printing medium different in permeation speed.

FIG. 14 is a diagram showing a relationship between the input line width [mm] and the output line width [mm] (relationship between the specified value and the actual value) in a case where lines of equal line width are printed on two kinds of printing medium whose permeation speed is different. In FIG. 14, the white circle indicates the line width in a case where printing is performed on the printing medium whose permeation speed is slow and the black circle indicates the line width in a case where printing is performed on the printing medium whose permeation speed is high. As shown in FIG. 14, the line printed on the printing medium whose permeation speed is slow is wider than the line printed on the printing medium whose permeation speed is high.

As described above, the degree of reproduction of the line width changes depending on the printing medium, and therefore, the method of adjusting the correction amount in accordance with the printing medium, which is used in the first embodiment, is effective. Alternatively, it may also be possible to generate anew a correction amount by the degree of reproduction of the line width of the printing medium. By these methods, it is possible to further improve the accuracy of the line width correction. However, in a case where these methods are performed, it is necessary to acquire the line width characteristic of the printing apparatus 108 for the printing medium to be used.

<About Acquisition of Line Width Characteristic>

In the following, a method of acquiring the line width characteristic of the printing apparatus 108 for each printing medium is explained. In the present embodiment, in order to acquire the line width characteristic of the printing apparatus 108, a line width determination chart as illustrated in FIG. 15A is used.

First, the printing apparatus 108 is caused to print the line width determination chart. In the line width determination chart shown in FIG. 15A, a plurality of line width detection images (hereinafter, also called patches) in which a plurality of lines having a predetermined line width is arranged in the form of a stripe is included. In FIG. 15A, in the plurality of patches, the plurality of lines included in one patch extends in a first direction (vertical direction) and is arranged by being shifted from one another in a second direction (horizontal direction) intersecting the first direction and the width in the second direction is the same.

Figure 15A:
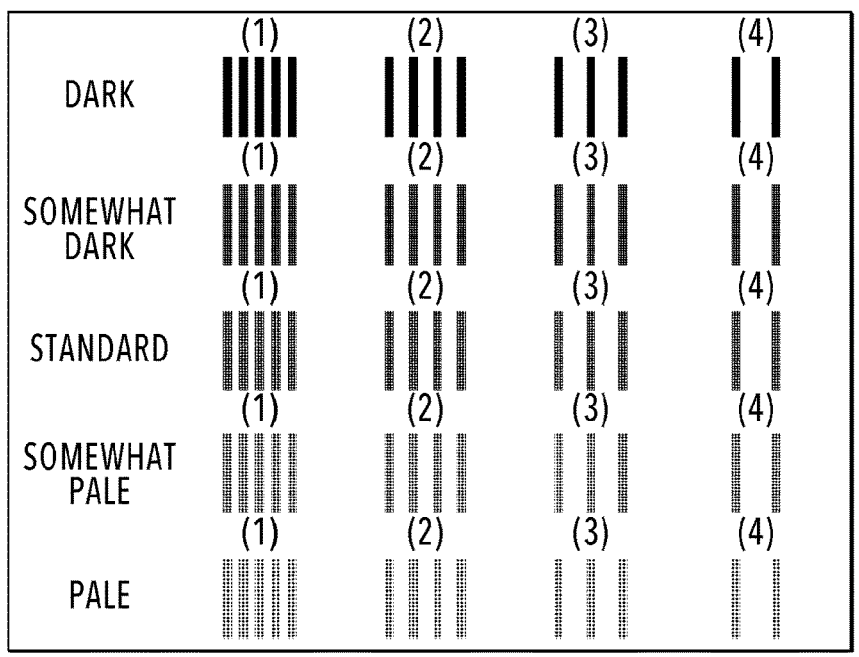
FIG. 15A to FIG. 15C are line width determination charts in a second embodiment.

In this line width determination chart, the applying amount for each line in the line width detection images arranged side by side in the horizontal direction in FIG. 15A is the same, but the applying amount for each line in the line width detection images arranged in the vertical direction in FIG. 15A is different. For example, the line width determination chart has a "dark" row in which a plurality of line width detection images (patches) including only the line whose applying amount is 100% is arrayed (in this example, a patch group including four patches is arrayed) and a "somewhat dark" row in which images including only the line whose applying amount is 80% are arrayed.

This line width determination chart further has a "standard" row in which the line width detection images including only the line whose applying amount is 60% are arrayed, a "somewhat pale" row in which the line width detection images including only the line whose applying amount is 40% are arrayed, and a "pale" row in which the line width detection images including only the line whose applying amount is 20% are arrayed. Each line width detection image within the line width determination chart is an image in the form of a stripe including one-pixel lines in units of 1,200 [dpi] and gaps between two adjacent lines.

Further, the line width determination chart shown in FIG. 15A has a column of (1), a column of (2), a column of (3), and a column of (4). In the line width detection image in the column of (1), the width of the gap between the adjacent one-pixel lines (arrangement distance) corresponds to one pixel. Similarly, in the image in the column of (2), the width of the gap between the adjacent one-pixel lines corresponds to two pixels, in the image in the column of (3), the width of the gap corresponds to three pixels, and in the image in the column of (4), the width of the gap corresponds to four pixels. In a case where the dot diameter at the time of printing is large or blurring occurs, the gaps are filled and the adjacent lines contact and adhere to each other as in FIG. 15B. By causing a user to select all the line width detection images in which the adjacent lines adhere to each other and receiving the information thereon, it is possible to detect the line width characteristic of the printing apparatus 108.

For example, a case is considered where in the row whose applying amount is "standard", in the image in the column (1), blanks are filled (gaps are not seen) and on the other hand, in the image in the column (2), the image in the column (3), and the image in the column (4), blanks are not filled (gaps are seen). In a case where it is assumed that the line thickens equally both to the left side and to the right side, it is known that the line having thickened has a width of 0.021 [mm] (=25.4 [mm]/1,200 [dpi]×1) or more because the blank corresponding to one pixel is filled. Further, it is known that the line having thickened has a width less than 0.042 [mm] (=25.4 [mm]/1,200 [dpi]×2) because the blank corresponding to two pixels is not filled. Consequently, here, 0.032 [mm] (=(0.021 [mm]+0.042 [mm]/2) obtained by averaging these values is regarded as the line width. Here, in a case where the pixel width of the image in which the pixel width of the blank is the largest of the images in which the lines adhere to each other at the time of printing in each row (the rightmost image of the images in which the lines adhere to each other in each row) is taken to be N [pixel], it is possible to calculate a line width (referred to as W) by equation (1) below.

[Mathematical equation 1]

$$W = 25.4/1{,}200 \times (N + 0.5) \qquad \text{equation (1)}$$

In order to estimate the line width on printed matter, it is necessary to acquire information indicating the image in which the interval between the lines is the largest of the line width detection images in which the two adjacent lines adhere to each other. In the above-described embodiment, by causing a user to select all the images in which the two adjacent lines adhere to each other and the gaps cannot be recognized visually, the line width on the printed matter is calculated based on the information. However, it may also be possible to cause a user to select the image whose interval between the lines is the largest from among the images in which the gap cannot be recognized visually or cause a user to select the image whose interval between the lines is the smallest from among the images in which the gap can be recognized visually. In a case where all the line width detection images included in the chart have the gap between the two adjacent lines on the image data, by acquiring information indicating the image in which one or more gaps cannot be recognized visually, it is known that the output line width becomes greater than the input line width, and therefore, it is possible to perform correction to thin the line width.

In the present embodiment, the processing to find the line width described previously is performed for each line whose applying amount is different. Due to this, it is possible to acquire the line width characteristic for each applying amount and the line width characteristic for each applying amount in a printing medium to be used is acquired. It may also be possible to repeatedly perform the procedure explained above for all the printing media having a possibility of being used (that is, all the printing media for which the printing apparatus 108 can perform printing).

The above is the contents relating to acquisition of the line width characteristic in the present embodiment.

<About Derivation of Correction Amount and Line Width Correction that Applies Correction Amount>

In the following, derivation of a correction amount and line width correction that applies a correction amount in the present embodiment are explained by using FIG. 16A and FIG. 16B. The CPU 111 of the printing apparatus 108 functions as an image processing unit and rasterizes image data in the PDL format into raster image data in the image data analysis processing J03. The CPU 111 performs fine adjustment of the line width in order to absorb the difference between the input line width and the width of the line reproduced by the printing apparatus 108 (output line width), in addition to the rasterization processing. In detail, the CPU 111 corrects the line width specifying value [mm] in the PDL format, that is, increases or reduces the width of the line to be reproduced by applying (adding) a correction amount to the line width specifying value.

In the following, the input line width [mm], which is the line width specifying value in the PDL format, and the correction amount that is applied to the input line width are explained.

FIG. 16A is a table storing each value of the input line width [mm] and the color of the line in the PDL format and the width of the line that is output (output line width) in a case where the line is printed on a printing medium by the printing apparatus 108. Further, in the table in FIG. 16A, in the field of the applying amount, the value of the applying amount corresponding to the color of the line is described.

Figure 17:
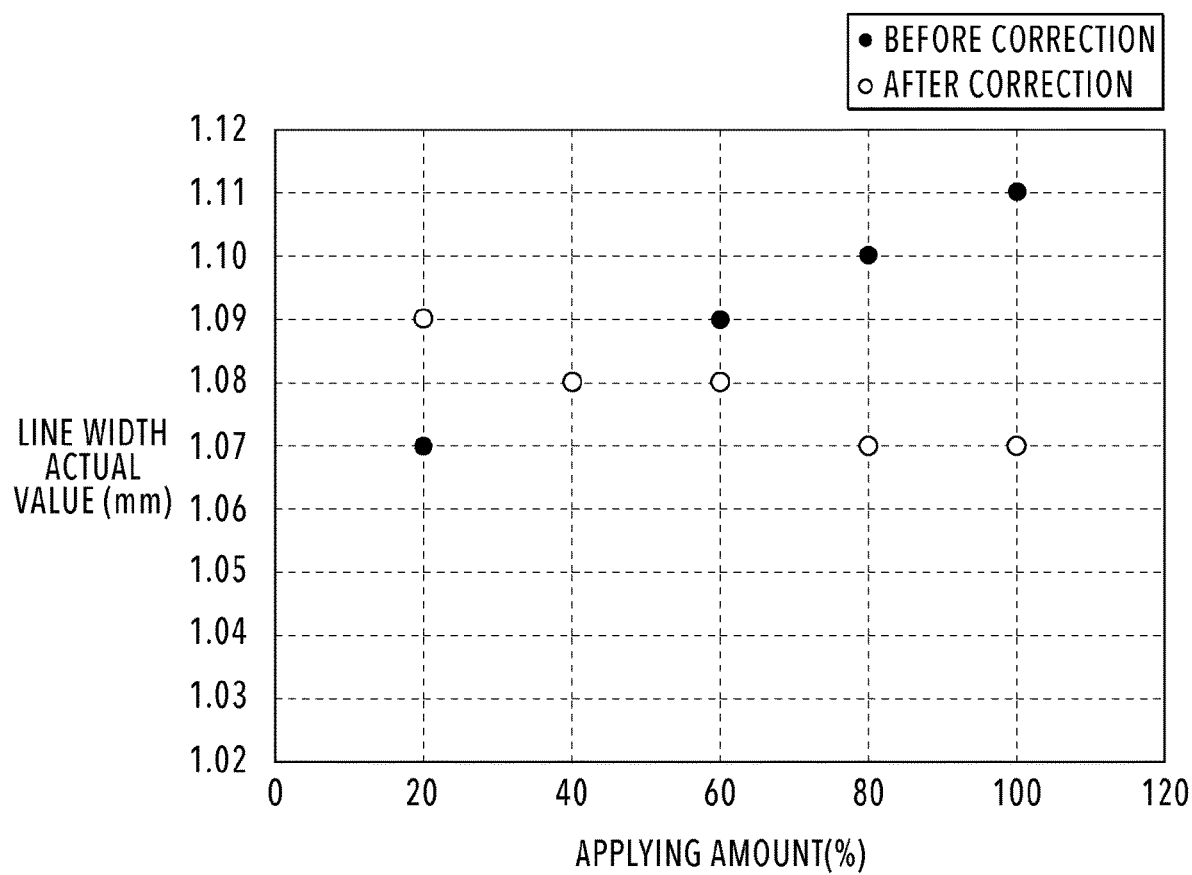
FIG. 17 is a diagram showing the output results in a case where line width correction is performed without taking into consideration the characteristic of a printing medium.

FIG. 17 shows a relationship between the applying amount and the line width actual value in a case where the line width correction is performed by using the correction table shown in FIG. 10A in the first embodiment at the time of printing a line having an input line width of 1.05 mm by the printing apparatus 108 having the line width characteristic shown in FIG. 16A. As shown in FIG. 17, for the line whose applying amount is 20% (for example, (R, G, B)= (255, 50, 255)), the actual value before correction is 1.07 mm and the actual value after correction is 1.09 mm and the difference from the input line width becomes larger on the contrary by the correction.

In the present embodiment, in order to absorb the difference in line width such as this, a line width correction table in accordance with a printing medium to be used is created. This method is explained by using FIG. 16B.

Figure 15B:
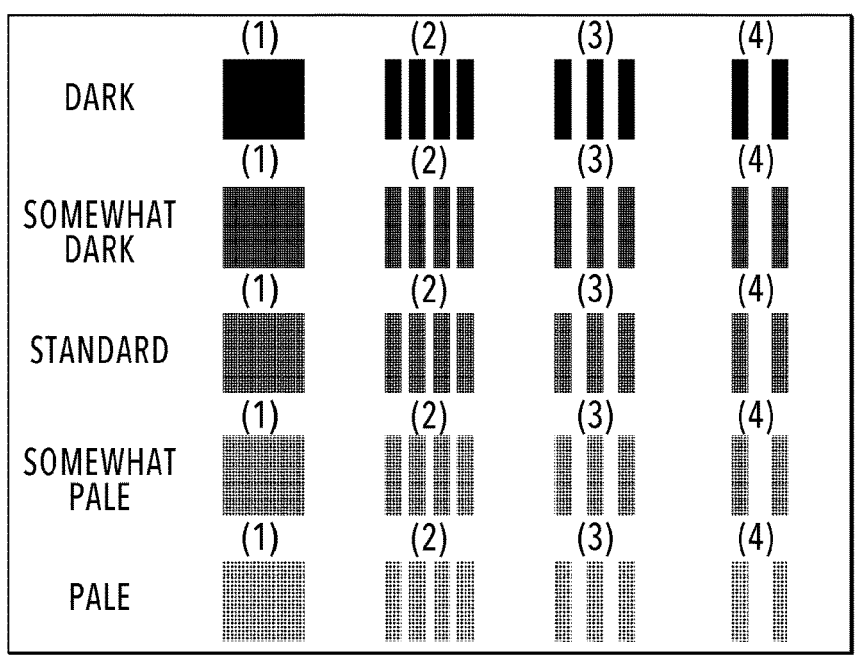
Figure 15C:
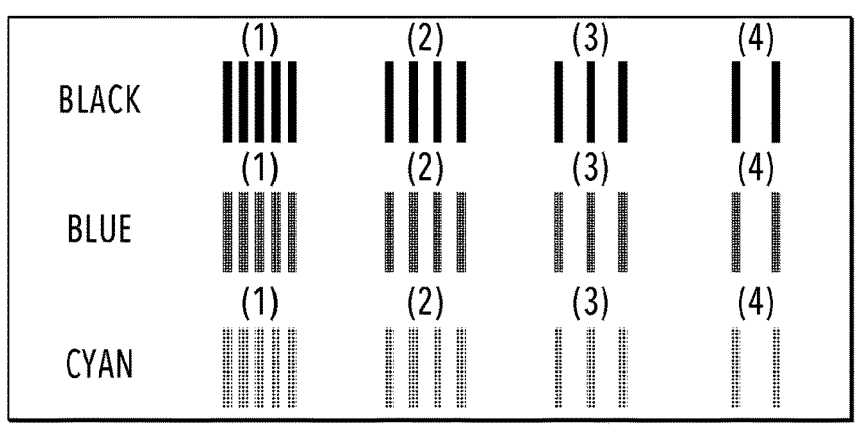

The line width correction table is created by describing the difference between the input line width and the output line width for each applying amount in the field of the correction amount of the table shown in FIG. 16B, which is found by causing the printing apparatus 108 to print the line width determination charts shown in FIG. 15A to FIG. 15C. The line width correction table that is created is not limited to that shown here and the line width correction table may be a three-dimensional LUT storing correction amounts corresponding to the colors of a variety of lines, for example, as shown in FIG. 10B.

Further, it may also be possible to set the correction amount for each of the color whose applying amount is relatively large and the color whose applying amount is relatively small, in place of creating the table storing the correction amount for each applying amount as in FIG. 16B. In this method, a chart that prints lines of at least two or more colors whose applying amounts are different as in FIG. 15A is printed and the difference between the input line width and the output line width for the line of the color whose applying amount is small and the difference between the input line width and the output line width for the line of the color whose applying amount is large are found as the correction amounts. For example, in a case where the tables in FIG. 15A to FIG. 15C are used, it is possible to determine the correction amount in a case where the applying amount is large based on the line width determination results for the "dark" row and the "somewhat dark" row. Further, it is possible to determine the correction amount in a case where the applying amount is small based on the line width determination results for the "pale" row and the "somewhat pale" row.

The chart shown in FIG. 15A is a chart in which only one kind of ink color is used and the chart in FIG. 15C is a chart in which black, primary color cyan, and secondary color blue are used as two or more kinds of color. In a case where a line drawing or a character is drawn, an ink that is unlikely to blur is used frequently for the black ink. On the other hand, for the color ink, an ink that is more likely to blur than the black ink is used frequently from the viewpoint of improvement of the absorption characteristics to glossy paper and color development properties. Consequently, here, the line width characteristic of the color ink is acquired by using the primary color cyan ink. The difference in lightness of cyan from the paper white is large among the primary colors of CMY and the visual recognition of cyan is high. Consequently, here, cyan is used in particular.

Further, there is a trend that the applying amount of the secondary color is large and the line is likely to blur and thicken. Consequently, here, the line width characteristic is acquired by using the chart by blue as the secondary color. Here, similarly, as the second color, B (=C+M) whose difference in lightness from the paper white is likely to appear and whose visual recognition is high compared to R (=M+Y) and G (=C+Y) is used. By doing so, it is possible to grasp the trend of the line width characteristic by color with the minimum number of colors while suppressing the number of sheets to be used for printing the chart.

Figure 18:
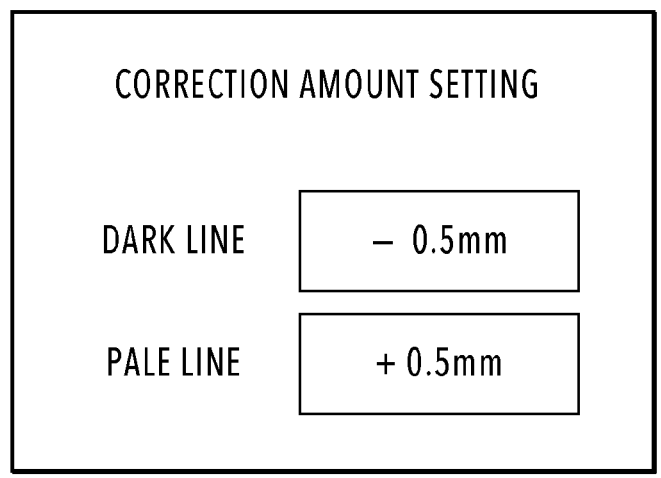
FIG. 18 is a UI for a user to input a correction amount.

Then, it is possible to correct the line width for each color by switching the correction amounts in accordance with the input line width for the line and the applying amount for the drawing-target line. In a case where the number of correction amounts to be set described previously is small, specifically, in a case where two kinds of correction amount are set, that is, the correction amount for a large applying amount and the correction amount for a small applying amount are set, it may also be possible for a user to set the correction amount directly to the printing apparatus 108. That is, via a UI, for example, as illustrated in FIG. 18, which is displayed on the display panel of the printing apparatus 108, the difference between the input line width and the output line width that is found by printing the line width determination charts in FIG. 15A to FIG. 15C by the printing apparatus 108 is input as the correction amount. One of the two input correction amounts is used selectively based on the applying amount corresponding to the color of the line.

Alternatively, it may also be possible to determine the correction amount by printing charts that print lines of at least two or more colors whose applying amounts are different, as in FIG. 15A to FIG. 15C, and comprehensively taking into consideration all the colors printed by the printing apparatus 108, printing media to be used, and the like. For example, in a case where the permeation speed is slow and the lines spread on the whole for each color, it is possible to determine one correction amount that reduces the input line width by averaging the correction amounts, and so on, and use the determined correction amount for the line width correction of all the lines. At this time, it may also be possible to prepare two or more correction amounts and switch the correction amounts as the case may be. Alternatively, it may also be possible for a user to input the correction amount to be used via the display panel of the printing apparatus 108 in place of printing the charts.

About Effect of the Present Embodiment

As described above, according to the present embodiment, the line width correction for each color of the line is enabled, which also takes into consideration the characteristic of a printing medium, such as the degree of blurring.

Third Embodiment

In the embodiment described previously, the aspect is explained in which the input line width is corrected to that the difference between the input line width specified by CAD application software for creating a drawing or the like and the output line width of the printing apparatus 108 is reduced. In contrast to this, in the present embodiment, an aspect is explained in which the input line width is corrected so that the output line widths are matched between different printing apparatuses, specifically, the output line width of the printing apparatus 108 matches with the output line width of the target printing apparatus 16. In printing a line having a line width specified by application software by two different printing apparatuses, there is a case where the output line width is different for each printing apparatus because the nozzle ejection amounts of the printing apparatuses are different and the like, and the present embodiment is effective in the case such as this.

In order to match the output line width of the printing apparatus 108 with the output line width of the target printing apparatus 116, it is necessary to acquire the line width characteristic of the target printing apparatus 116. Consequently, by also causing the target printing apparatus 116 to print the line width determination charts (see FIG. 15A to FIG. 15C) explained in the second embodiment and causing a user to select images in which lines adhere to each other in the printing results, the line width of the target printing apparatus 116 is found. Then, based on the found line width of the target printing apparatus 116, the correction amount of the embodiment described previously is adjusted. Due to this, it is possible to implement the line width correction of the present embodiment. Alternatively, it may also be possible to find anew a correction amount based on the difference between the output line width of the target printing apparatus 116 and the output line width of the printing apparatus 108 and correct the input line width in accordance with the correction amount.

<About Adjustment of Correction Amount>

In the following, an adjustment method of a correction amount in the present embodiment is explained by using FIG. 19A and FIG. 19B. FIG. 19A is a table storing the results of printing five kinds of line having an input line width of 1.05 mm and different in color by the target printing apparatus 116 and storing output line widths of the target printing apparatus 116 for each applying amount (20%, 40%, 60%, . . . ).

On the other hand, FIG. 19B is a table storing correction amounts for each applying amount corresponding to a different color of a line, which are applied in a case where printing is performed by the printing apparatus 108. In the fields of correction amount (1) of the table, the correction amounts adopted in the first embodiment, that is, the correction amounts (see FIG. 10A) for matching with an input line width of 1.05 mm in the PDL format are described. In the present embodiment, the value in the field of the output line width in the table in FIG. 19A is taken to be a target and the correction amount (correction amount (1)) used in the first embodiment is adjusted so that the output line width of the printing apparatus 108 becomes this value. In detail, the difference between the input line width of the target printing apparatus 116 and the output line width of the target printing apparatus 116 is added to correction amount (1).

Specific explanation is given. For example, in a case where the color value of a line is (255, 50, 255), with reference to the table in FIG. 19A, the input line width of the target printing apparatus 116 is 1.05 mm and on the other hand, the output line width is 1.02 mm, and therefore, it is known that a deviation of −0.03 mm occurs. That is, in a case where the line having an input line width of 1.05 mm is printed by the target printing apparatus 116, the reproduced line width is 0.03 mm less than the target value. In the present embodiment, based on the amount of deviation, correction amount (1) is adjusted. Specifically, it is possible to obtain +0.01 mm as the correction amount after the adjustment (referred to as correction amount (2)) as a result of adding −0.03 mm to +0.04 mm, which is correction amount (1).

For the other colors of the lines similarly, it is possible to find the correction amount after the adjustment (correction amount (2)) for matching with the output line width of the target printing apparatus 116 by adjusting the correction amount itself found in the embodiment described previously. For example, in a case where the color value of a line is (255, 100, 255), with reference to the table in FIG. 19A, the difference between the input line width and the output line width is −0.02 mm. Consequently, with reference to the table in FIG. 19B, to +0.01 mm, which is the value described in the cell whose row is (255, 100, 255) and whose column is correction amount (1), −0.02 mm, which is the difference, it added. Due to this, it is possible to find −0.01 mm as the correction amount after the adjustment (correction amount (2)).

Further, in a case where the color value of a line is (255, 150, 255), with reference to the table in FIG. 19A, the difference between the input line width and the output line width is +0.01 mm. Consequently, with reference to the table in FIG. 19B, to −0.01 mm, which is the correction amount described in the cell whose row is (255, 150, 255) and whose column is correction amount (1), +0.01 mm, which is the difference, is added. Due to this, it is possible to find 0.00 mm as the correction amount after the adjustment (correction amount (2)).

Here, the case is explained where the table as shown in FIG. 19B is used, which stores the correction amount after the adjustment (correction amount (2)) for each applying amount. However, it may also be possible to use a three-dimensional LUT similar to that of the second embodiment in place of the table such as this. In a case where a three-dimensional LUT is used, it is sufficient to set the correction amount after the adjustment (correction amount (2)) for the applying amount corresponding to each of the RGB values. FIG. 20 is a diagram showing an example of the table such as this.

Further, there is a case where the degree of reproduction of the line width of the printing apparatus is different depending on the printing medium as explained in the second embodiment. In the case such as this, it is sufficient to create a line width correction table based on the results of printing an identical line width determination chart on an identical printing medium to be used by the target printing apparatus 116 and the printing apparatus 108, respectively. In this method, it is sufficient to store the difference between the output line width of the target printing apparatus 116 and the output line width of the printing apparatus 108 as the correction amount.

By adding the correction amount that is found as explained above to the input line width as in the case with the embodiment described previously, it is possible to match the output line width of the printing apparatus 108 with the output line width of the target printing apparatus 116.

About Effect of the Present Embodiment

As described above, according to the present embodiment, it is made possible to match output line widths on printed matter that is printed by a plurality of printing apparatuses based on identical image data.

OTHER EMBODIMENTS

It is also possible to implement the present disclosure by processing to supply a program that implements one or more functions of the above-described embodiments to a system or an apparatus via a network or a storage medium and to cause one or more processors in a computer of the system or the apparatus to read and execute the program. Further, it is also possible to implement the present disclosure by a circuit (for example, ASIC) that implements one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to one embodiment of the present invention, in a case where an image is printed by a printing apparatus based on print data including lines, it is made possible to reduce the difference between a target line width and the width of a line that is printed by the printing apparatus by correcting the line width in accordance with the color information corresponding to the color of the line.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-182957, filed Sep. 27, 2018, which is hereby incorporated by reference herein in its entirety.

What is claimed is:

1. An image processing apparatus comprising:
   an acquisition unit configured to acquire a correction amount for correcting a line width specified in a drawing command in accordance with an ink applying amount per unit area determined for a color of a line specified in the drawing command; and
   a correction unit configured to correct the line width specified in the drawing command in accordance with the correction amount,
   wherein the acquisition unit and the correction unit are implemented by at least one processor of the image processing apparatus, and
   wherein the correction amount acquired by the acquisition unit is derived in advance in accordance with the ink applying amount per unit area based on a selection by a user for results of outputting, on a printing medium, by a first printing apparatus for performing printing by using data corrected by the correction unit, a line width determination chart in which a plurality of patch groups whose ink applying amount per unit area is different from one another are arrayed.

2. The image processing apparatus according to claim 1, further comprising a determination unit configured to determine the correction amount in accordance with an ink applying amount per unit area, which is determined uniquely for the color of the line specified in the drawing command,
   wherein the determination unit is implemented by the at least one processor of the image processing apparatus.

3. The image processing apparatus according to claim 2, wherein the determination unit determines the correction amount by referring to a line width correction table in which each value of an ink applying amount per unit area and a correction amount corresponding to an ink applying amount per unit area are stored.

4. The image processing apparatus according to claim 3, wherein the line width correction table is prepared in advance.

5. The image processing apparatus according to claim 3, further comprising:
   a calculation unit configured to calculate an output line width indicating a line width reproduced by a printing apparatus based on a selection by a user for results of outputting by the printing apparatus on a printing medium a line width determination chart for printing a line having an input line width indicating a line width specified in the drawing command;
   a derivation unit configured to derive a difference between the input line width and the output line width, which corresponds to an ink applying amount per unit area, as the correction amount; and
   a creation unit configured to create the line width correction table based on a correction amount derived by the derivation unit,
   wherein the calculation unit, the derivation unit, and the creation unit are implemented by the at least one processor of the image processing apparatus, and
   wherein in the line width determination chart, a plurality of patch groups whose ink applying amount per unit area is different from one another is arrayed, each patch including a plurality of lines extending in a first direction, arranged along a second direction intersecting the first direction, and having an identical width in the first direction, and each patch group including a plurality of patches whose interval between two adjacent lines is different from one another.

6. The image processing apparatus according to claim 5, wherein the plurality of patch groups includes at least an image including lines of a first color and an image including lines of a second color whose ink applying amount per unit area is larger than that of the first color.

7. The image processing apparatus according to claim 6, further comprising:
   a setting unit configured to set a correction amount for the line of the first color and a correction amount for the line of the second color,
   wherein the setting unit is implemented by the at least one processor of the image processing apparatus.

8. The image processing apparatus according to claim 6, wherein the first color is a chromatic color, and
   wherein the second color is black.

9. The image processing apparatus according to claim 3, further comprising:
   a first calculation unit configured to calculate an output line width indicating a line width reproduced by the first printing apparatus based on a selection by a user for results of outputting a line width determination chart on a printing medium by the first printing apparatus;
   a second calculation unit configured to calculate an output line width indicating a line width reproduced by a second printing apparatus based on a selection of a user for results of outputting the line width determination chart on the printing medium by the second printing apparatus;
   a derivation unit configured to derive the correction amount based on the output line width of the first printing apparatus and the output line width of the second printing apparatus, which corresponds to an ink applying amount per unit area; and
   a creation unit configured to create the line width correction table based on a correction amount derived by the derivation unit,
   wherein the first calculation unit, the second calculation unit, the derivation unit, and the creation unit are implemented by the at least one processor of the image processing apparatus,
   wherein the line width determination chart is a chart for printing a line having an input line width indicating a line width specified in the drawing command,
   wherein in the line width determination chart, a plurality of patch groups whose ink applying amount per unit area is different from one another is arrayed, each patch including a plurality of lines extending in a first direction, arranged along a second direction intersecting the first direction, and having an identical width in the first direction, and each patch group including a plurality of patches whose interval between two adjacent lines is different from one another, and
   wherein the plurality of patch groups includes at least an image including lines of a first color and an image including lines of a second color whose ink applying amount per unit area is larger than that of the first color.

10. The image processing apparatus according to claim 2, wherein the determination unit determines the correction amount by referring to a table storing each value of the color of the line and the correction amount corresponding to the color of the line.

11. The image processing apparatus according to claim 2, further comprising:
a calculation unit configured to calculate an output line width indicating a line width reproduced by a printing apparatus based on a selection by a user for results of outputting by the printing apparatus on a printing medium a line width determination chart for printing a line having an input line width indicating a line width specified in the drawing command; and
a derivation unit configured to derive a difference between the input line width and the output line width, which corresponds to an ink applying amount per unit area, as the correction amount,
wherein the calculation unit and the derivation unit are implemented by the at least one processor of the image processing apparatus, and
wherein in the line width determination chart, a plurality of patch groups whose ink applying amount per unit area is different from one another is arrayed, each patch including a plurality of lines extending in a first direction, arranged along a second direction intersecting the first direction, and having an identical width in the first direction, and each patch group including a plurality of patches whose interval between two adjacent lines is different from one another.

12. The image processing apparatus according to claim 11, further comprising:
a setting unit configured to set an average of correction amounts corresponding to ink applying amounts per unit area derived by the derivation unit as a correction amount for lines of all colors,
wherein the setting unit is implemented by the at least one processor of the image processing apparatus.

13. An image processing method performed by an image processing apparatus, the method comprising:
a step of acquiring, by an acquisition unit, a correction amount for correcting a line width specified in a drawing command in accordance with an ink applying amount per unit area determined for a color of a line specified in the drawing command; and
a step of correcting, by a correction unit, the line width specified in the drawing command in accordance with the correction amount,
wherein the acquisition unit and the correction unit are implemented by at least one processor of the image processing apparatus, and
wherein the correction amount acquired by the acquisition unit is derived in advance in accordance with the ink applying amount per unit area based on a selection by a user for results of outputting, on a printing medium, by a first printing apparatus for performing printing by using data corrected by the correction unit, a line width determination chart in which a plurality of patch groups whose ink applying amount per unit area is different from one another are arrayed.

14. A non-transitory computer readable storage medium storing a program for causing a computer to perform an image processing method comprising:
a step of acquiring, by an acquisition unit, a correction amount for correcting a line width specified in a drawing command in accordance with an ink applying amount per unit area determined for a color of a line specified in the drawing command; and
a step of correcting, by a correction unit, the line width specified in the drawing command in accordance with the correction amount,
wherein the acquisition unit and the correction unit are implemented by at least one processor of the computer, and
wherein the correction amount acquired by the acquisition unit is derived in advance in accordance with the ink applying amount per unit area based on a selection of a user for results of outputting, on a printing medium, by a first printing apparatus for performing printing by using data corrected by the correction unit, a line width determination chart in which a plurality of patch groups whose ink applying amount per unit area is different from one another are arrayed.

15. An image processing apparatus comprising:
an acquisition unit configured to acquire a drawing command in which a color and a line width of a line are specified;
a memory for holding a correction amount corresponding to the color of the line specified in the drawing command; and
a correction unit configured to correct the line width specified in the drawing command in accordance with the correction amount,
wherein the acquisition unit and the correction unit are implemented by at least one processor of the image processing apparatus,
wherein the memory holds a correction amount for a case where the color of the line specified in the drawing command is a first color and a correction amount for a case where the color of the line specified in the drawing command is a second color, and
wherein at least one of the following conditions is satisfied:
(1) the first color is black and the second color is a chromatic color; and
(2) in the drawing command, the color of the line is represented by an R value, a G value, and a B value.

16. The image processing apparatus according to claim 15, wherein the first color is black, and
wherein the second color is a chromatic color.

17. The image processing apparatus according to claim 15, wherein in the drawing command, the color of the line is represented by an R value, a G value, and a B value.

18. The image processing apparatus according to claim 15, further comprising:
a determination unit configured to determine the correction amount in accordance with an ink applying amount per unit area, which is determined uniquely for the color of the line specified in the drawing command, wherein the determination unit determines the correction amount by referring to a line width correction table in which each value of an ink applying amount per unit area and a correction amount corresponding to an ink applying amount per unit area are stored;
a calculation unit configured to calculate an output line width indicating a line width reproduced by a printing apparatus based on a selection by a user for results of outputting by the printing apparatus on a printing medium a line width determination chart for printing a line having an input line width indicating a line width specified in the drawing command;
a derivation unit configured to derive a difference between the input line width and the output line width, which corresponds to an ink applying amount per unit area, as the correction amount; and a creation unit configured to create the line width correction table based on a correction amount derived by the derivation unit, wherein the determination unit, the calculation unit, the derivation unit, and the creation unit are implemented by the at least one processor of the image processing apparatus, and wherein in the line width determination chart, a plurality of patch groups whose ink applying amount per unit area is different from one another is arrayed, each patch including a plurality of lines extending in a first direction, arranged along a second direction intersecting the first direction, and having an identical width in the first direction, and each patch group including a plurality of patches whose interval between two adjacent lines is different from one another.

19. The image processing apparatus according to claim 15, further comprising:

a calculation unit configured to calculate an output line width indicating a line width reproduced by a printing apparatus based on a selection by a user for results of outputting by the printing apparatus on a printing medium a line width determination chart for printing a line having an input line width indicating a line width specified in the drawing command; and a derivation unit configured to derive a difference between the input line width and the output line width, which corresponds to an ink applying amount per unit area, as the correction amount, wherein the calculation unit and the derivation unit are implemented by the at least one processor of the image processing apparatus, and wherein in the line width determination chart, a plurality of patch groups whose ink applying amount per unit area is different from one another is arrayed, each patch including a plurality of lines extending in a first direction, arranged along a second direction intersecting the first direction, and having an identical width in the first direction, and each patch group including a plurality of patches whose interval between two adjacent lines is different from one another.

\* \* \* \* \*